(12) United States Patent
Song et al.

(10) Patent No.: US 12,431,537 B2
(45) Date of Patent: Sep. 30, 2025

(54) ELECTROLYTE INCLUDING ELECTROLYTE SOLVENT, FLUOROETHER, AND BIS(FLUOROSULFONYL) SALT, AND LITHIUM METAL ELECTROCHEMICAL CELLS INCLUDING THE SAME

(71) Applicant: 24M Technologies, Inc., Cambridge, MA (US)

(72) Inventors: Junhua Song, Sudbury, MA (US); Junzheng Chen, Concord, MA (US); Dhanya Puthusseri, Millis, MA (US); Frank Yongzhen Fan, Arlington, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 19/172,319

(22) Filed: Apr. 7, 2025

(65) Prior Publication Data

US 2025/0260060 A1 Aug. 14, 2025

Related U.S. Application Data

(63) Continuation of application No. 18/747,106, filed on Jun. 18, 2024, now Pat. No. 12,300,786.

(Continued)

(51) Int. Cl.
*H01M 10/0568* (2010.01)
*H01M 4/02* (2006.01)
(Continued)

(52) U.S. Cl.
CPC ....... *H01M 10/0568* (2013.01); *H01M 4/382* (2013.01); *H01M 4/5825* (2013.01);
(Continued)

(58) Field of Classification Search
CPC .......... H01M 10/0568; H01M 10/052; H01M 10/0562; H01M 10/0567; H01M 4/382; H01M 4/5825; H01M 4/625
(Continued)

(56) References Cited

U.S. PATENT DOCUMENTS 8,722,226 B2 5/2014 Chiang et al.
8,722,227 B2 5/2014 Chiang et al.
(Continued)

FOREIGN PATENT DOCUMENTS

CN 108598589 A * 9/2018 ........ H01M 10/0568
CN 112382792 A * 2/2021 ............. C07C 29/70
(Continued)

OTHER PUBLICATIONS

"Different." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1240277. (Year: 2010).*

(Continued)

*Primary Examiner* — Sean P Cullen
(74) *Attorney, Agent, or Firm* — Cooley LLP

(57) ABSTRACT

Systems, devices, and methods described herein relate to electrolyte formulations and the incorporation thereof into batteries. In some aspects, an electrolyte composition can comprise between about 10 wt % and about 42 wt % of an electrolyte solvent, between about 13 wt % and about 59 wt % of a fluoroether. In some embodiments, the electrolyte solvent can make up between about 26 wt % and about 39 wt % of the composition. In some embodiments, the fluoroether can make up between about 18 wt % and about 36 wt % of the composition. In some embodiments, the composition can include between about 0.5 wt % and about 1.5 wt % of a first additive. In some embodiments, the compo- (Continued)

sition can include between about 0.5 wt % and about 5 wt % of a second additive.

36 Claims, 13 Drawing Sheets

Related U.S. Application Data

(60) Provisional application No. 63/633,426, filed on Apr. 12, 2024, provisional application No. 63/545,692, filed on Oct. 25, 2023, provisional application No. 63/545,402, filed on Oct. 24, 2023.

(51) Int. Cl.
| | |
|---|---|
| *H01M 4/38* | (2006.01) |
| *H01M 4/58* | (2010.01) |
| *H01M 4/62* | (2006.01) |
| *H01M 10/052* | (2010.01) |
| *H01M 10/0562* | (2010.01) |
| *H01M 10/0567* | (2010.01) |

(52) U.S. Cl.
CPC ......... *H01M 4/625* (2013.01); *H01M 10/052* (2013.01); *H01M 10/0562* (2013.01); *H01M 10/0567* (2013.01); *H01M 2004/027* (2013.01); *H01M 2004/028* (2013.01); *H01M 2300/0034* (2013.01); *H01M 2300/0037* (2013.01); *H01M 2300/0068* (2013.01)

(58) Field of Classification Search
USPC ............................................ 429/231.95, 322
See application file for complete search history.

(56) References Cited

U.S. PATENT DOCUMENTS

| | | |
|---|---|---|
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,509,176 B2 | 11/2016 | Carter et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,342,567 B2 | 5/2022 | Chiang et al. |
| 11,394,049 B2 | 7/2022 | Tan et al. |
| 11,462,722 B2 | 10/2022 | Aranami et al. |
| 11,469,065 B2 | 10/2022 | Lawrence et al. |
| 11,476,551 B2 | 10/2022 | Tyler et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 11,631,920 B2 | 4/2023 | Bazzarella et al. |
| 11,646,437 B2 | 5/2023 | Bazzarella et al. |
| 11,652,203 B2 | 5/2023 | Zagars et al. |
| 11,742,525 B2 | 8/2023 | Aranami et al. |
| 11,749,804 B2 | 9/2023 | Chen et al. |
| 11,757,129 B2 | 9/2023 | Tan et al. |
| 11,764,353 B2 | 9/2023 | Ota et al. |
| 11,804,595 B2 | 10/2023 | Ota et al. |
| 11,811,119 B2 | 11/2023 | Chiang et al. |
| 11,831,026 B2 | 11/2023 | Ota et al. |
| 11,855,250 B2 | 12/2023 | Taylor et al. |
| 11,876,194 B2 | 1/2024 | Chiang et al. |
| 11,888,144 B2 | 1/2024 | Slocum et al. |
| 11,909,050 B2 | 2/2024 | Bao et al. |
| 11,909,077 B2 | 2/2024 | Chiang et al. |
| 11,942,654 B2 | 3/2024 | Bazzarella et al. |
| 11,961,990 B2 | 4/2024 | Ota et al. |
| 11,984,564 B1 | 5/2024 | Chen |
| 12,009,551 B2 | 6/2024 | Bazzarella et al. |
| 12,068,445 B2 | 8/2024 | Bazzarella et al. |
| 12,068,486 B2 | 8/2024 | Lawrence et al. |
| 12,095,025 B2 | 9/2024 | Tan et al. |
| 12,100,816 B2 | 9/2024 | Chen |
| 12,107,211 B2 | 10/2024 | Chen et al. |
| 12,107,252 B2 | 10/2024 | Aranami et al. |
| 12,119,458 B2 | 10/2024 | Chen et al. |
| 12,125,984 B2 | 10/2024 | Zagars et al. |
| 12,142,721 B2 | 11/2024 | Taylor |
| 12,176,519 B2 | 12/2024 | Zagars et al. |
| 12,183,909 B2 | 12/2024 | Zagars et al. |
| 12,199,240 B2 | 1/2025 | Tan et al. |
| 12,272,818 B2 | 4/2025 | Ota et al. |
| 12,278,344 B2 | 4/2025 | Chen et al. |
| 2010/0047671 A1 | 2/2010 | Chiang et al. |
| 2010/0104817 A1 | 4/2010 | Carlson |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0228385 A1 | 9/2011 | Avison et al. |
| 2011/0274948 A1 | 11/2011 | Duduta et al. |
| 2012/0050848 A1 | 3/2012 | Carlson et al. |
| 2012/0069429 A1 | 3/2012 | Barrett et al. |
| 2012/0135257 A1 | 5/2012 | Carlson et al. |
| 2012/0164499 A1 | 6/2012 | Chiang et al. |
| 2012/0183842 A1 | 7/2012 | Kawasaki et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2013/0344367 A1 | 12/2013 | Chiang et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |

(56) References Cited

U.S. PATENT DOCUMENTS

| | | |
|---|---|---|
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0062829 A1 | 3/2017 | Ryu et al. |
| 2017/0077464 A1 | 3/2017 | Bazzarella et al. |
| 2017/0098857 A1 | 4/2017 | Carlson et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2018/0316051 A1 | 11/2018 | Lee et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chiang et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0395583 A1 | 12/2020 | Carlson et al. |
| 2020/0411825 A1 | 12/2020 | Bazzarella et al. |
| 2021/0091366 A1 | 3/2021 | Bazzarella et al. |
| 2021/0167351 A1 | 6/2021 | Zagars et al. |
| 2021/0218062 A1 | 7/2021 | Xu et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0265631 A1 | 8/2021 | Chen et al. |
| 2021/0296733 A1 | 9/2021 | Carlson et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0344775 A1 | 10/2022 | Carlson et al. |
| 2022/0344776 A1 | 10/2022 | Carlson |
| 2022/0352597 A1 | 11/2022 | Chen et al. |
| 2022/0352598 A1 | 11/2022 | Avison et al. |
| 2022/0393243 A1 | 12/2022 | Han et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0098274 A1 | 3/2023 | Carlson et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |
| 2023/0282906 A1 | 9/2023 | Chen et al. |
| 2023/0291063 A1 | 9/2023 | Holman et al. |
| 2023/0307803 A1 | 9/2023 | Bazzarella et al. |
| 2023/0317934 A1 | 10/2023 | Saimen et al. |
| 2023/0327068 A1 | 10/2023 | Tyler et al. |
| 2023/0327077 A1 | 10/2023 | Zagars et al. |
| 2023/0327094 A1 | 10/2023 | Seo et al. |
| 2023/0327178 A1 | 10/2023 | Taylor et al. |
| 2023/0335748 A1 | 10/2023 | Chen et al. |
| 2023/0335799 A1* | 10/2023 | Peng ............ H01M 10/0567 |
| 2023/0352755 A1 | 11/2023 | Aragon et al. |
| 2023/0369603 A1 | 11/2023 | Ota et al. |
| 2023/0369719 A1 | 11/2023 | Bazzarella et al. |
| 2023/0378512 A1 | 11/2023 | Bazzarella et al. |
| 2023/0395771 A1 | 12/2023 | Zagars et al. |
| 2023/0411695 A1 | 12/2023 | Narita et al. |
| 2024/0039001 A1 | 2/2024 | Kusachi et al. |
| 2024/0039120 A1 | 2/2024 | Carlson |
| 2024/0047689 A1 | 2/2024 | Hartzog et al. |
| 2024/0047772 A1 | 2/2024 | Hartzog et al. |
| 2024/0047810 A1 | 2/2024 | Hartzog et al. |
| 2024/0047832 A1 | 2/2024 | Hartzog et al. |
| 2024/0055702 A1 | 2/2024 | Ota et al. |
| 2024/0063417 A1 | 2/2024 | Chiang et al. |
| 2024/0079647 A1 | 3/2024 | Tan et al. |
| 2024/0088355 A1 | 3/2024 | Ota et al. |
| 2024/0106003 A1 | 3/2024 | Aranami et al. |
| 2024/0128541 A1 | 4/2024 | Nematollahi |
| 2024/0178502 A1 | 5/2024 | Ota |
| 2024/0204264 A1 | 6/2024 | Chen et al. |
| 2024/0204288 A1 | 6/2024 | Nematollahi |
| 2024/0213572 A1 | 6/2024 | Nematollahi |
| 2024/0234705 A1 | 7/2024 | Ota et al. |
| 2024/0274855 A1 | 8/2024 | Chiang et al. |
| 2024/0274864 A1 | 8/2024 | Taylor et al. |
| 2024/0291050 A1 | 8/2024 | Chen et al. |
| 2024/0291088 A1 | 8/2024 | Nematollahi |
| 2024/0304882 A1 | 9/2024 | Kunanusont et al. |
| 2024/0304942 A1 | 9/2024 | Patel et al. |
| 2024/0347799 A1 | 10/2024 | Chiang |
| 2024/0372212 A1 | 11/2024 | Chen |
| 2024/0372213 A1 | 11/2024 | Chen |
| 2024/0372214 A1 | 11/2024 | Chen |
| 2024/0379930 A1 | 11/2024 | Axelsen et al. |
| 2024/0380061 A1 | 11/2024 | Zimmerman et al. |
| 2024/0405391 A1 | 12/2024 | Bazzarella |
| 2024/0413407 A1 | 12/2024 | Chen et al. |
| 2024/0413482 A1 | 12/2024 | Bazzarella et al. |
| 2024/0419866 A1 | 12/2024 | Nematollahi |

(56) References Cited

U.S. PATENT DOCUMENTS

| | | |
|---|---|---|
| 2024/0429399 A1 | 12/2024 | Lawrence et al. |
| 2024/0429429 A1 | 12/2024 | Bazzarella et al. |
| 2024/0429463 A1 | 12/2024 | Chen et al. |
| 2024/0429466 A1 | 12/2024 | Chen et al. |
| 2025/0023009 A1 | 1/2025 | Ota et al. |
| 2025/0046860 A1 | 2/2025 | Chen et al. |
| 2025/0054939 A1 | 2/2025 | Aranami |
| 2025/0070261 A1 | 2/2025 | Zagars |
| 2025/0105337 A1 | 3/2025 | Taylor et al. |
| 2025/0105357 A1 | 3/2025 | Cui et al. |
| 2025/0105449 A1 | 3/2025 | Carlson et al. |
| 2025/0125326 A1 | 4/2025 | Kusachi et al. |
| 2025/0140924 A1 | 5/2025 | Song et al. |

FOREIGN PATENT DOCUMENTS

| | | | | |
|---|---|---|---|---|
| CN | 113629365 A | * | 11/2021 | |
| CN | 114171800 A | * | 3/2022 | .......... H01M 10/058 |
| CN | 114256508 A | | 3/2022 | |
| CN | 114551914 A | * | 5/2022 | ............ H01M 6/168 |
| CN | 115810795 A | * | 3/2023 | .......... H01M 10/052 |
| CN | 116598474 A | | 8/2023 | |
| JP | 2010113920 A | * | 5/2010 | ........ H01M 10/0413 |
| KR | 20210000503 A | | 1/2021 | |
| WO | WO-2012024499 A1 | | 2/2012 | |
| WO | WO-2012088442 A2 | | 6/2012 | |
| WO | WO-2021086485 A1 | | 5/2021 | |
| WO | WO-2021235760 A1 | | 11/2021 | |
| WO | WO-2023215607 A1 | | 11/2023 | |
| WO | WO-2024173681 A1 | | 8/2024 | |
| WO | WO-2024226580 A2 | | 10/2024 | |

OTHER PUBLICATIONS

Final Office Action for U.S. Appl. No. 18/747,106 mailed Sep. 30, 2024, 18 pages.
International Search Report and Written Opinion for International Application No. PCT/US2024/052434 mailed Mar. 21, 2025, 19 pages.
Invitation to Pay Additional fees for International Application No. PCT/US2024/052434, mailed Jan. 30, 2025, 12 pages.
Non-Final Office Action for U.S. Appl. No. 18/747,106 mailed Aug. 28, 2024, 26 pages.
Notice of allowance for U.S. Appl. No. 18/747,106 mailed Mar. 5, 2025, 8 pages.
Notice of Allowance for U.S. Appl. No. 18/747,106 mailed Nov. 14, 2024, 8 pages.
Supplemental Notice of Allowance for U.S. Appl. No. 18/747,106 mailed Nov. 21, 2024, 2 pages.
U.S. Appl. No. 15/262,581, filed Sep. 12, 2016, by Chiang et al.
U.S. Appl. No. 15/425,368, filed Feb. 6, 2017, by Slocum et al.
U.S. Appl. No. 16/139,791, filed Sep. 24, 2018, by Ota et al.
U.S. Appl. No. 16/736,553, filed Jan. 7, 2020, by Ota et al.
U.S. Appl. No. 18/223,894, filed Jul. 19, 2023, by Chen et al.
U.S. Appl. No. 18/411,431, filed Jan. 12, 2024, by Chiang et al.
U.S. Appl. No. 18/741,181, filed Jun. 12, 2024, by Chen et al.
U.S. Appl. No. 18/773,019, filed Jul. 15, 2024, by Tan et al.
U.S. Appl. No. 18/950,762, filed Nov. 18, 2024, by Zagars et al.
U.S. Appl. No. 19/058,363, filed Feb. 20, 2025, by Hartzog et al.

* cited by examiner

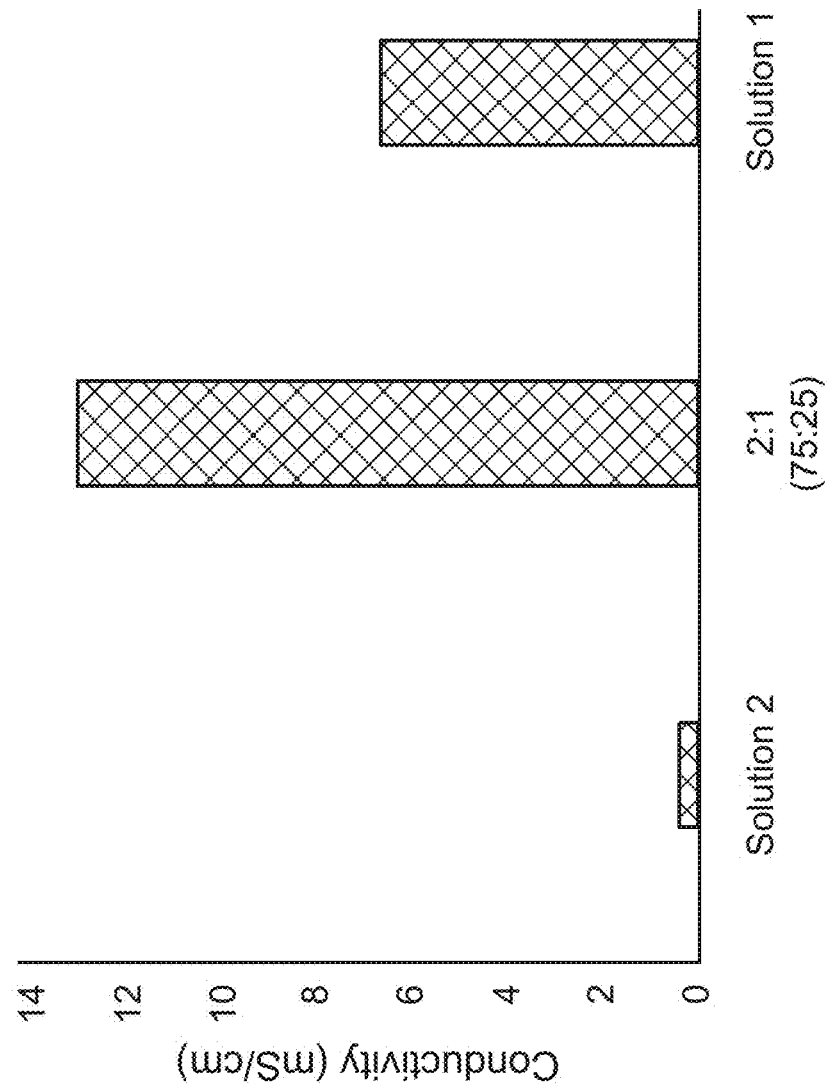

ELECTROLYTE INCLUDING ELECTROLYTE SOLVENT, FLUOROETHER, AND BIS(FLUOROSULFONYL) SALT, AND LITHIUM METAL ELECTROCHEMICAL CELLS INCLUDING THE SAME

CROSS-REFERENCE TO RELATED APPLICATIONS

The present application is a continuation of U.S. patent application Ser. No. 18/747,106, filed Jun. 18, 2024, and entitled "Electrolyte Including Electrolyte Solvent, Fluoroether, and Bis(Fluorosulfonyl) Imide Salt, and Lithium Metal Electrochemical Cells Including The Same," which claims priority to and benefit of U.S. Provisional Application No. 63/545,402, filed Oct. 24, 2023, and entitled, "High Performance Electrolyte for Electrochemical Energy Storage Devices, and Methods of Producing the Same," U.S. Provisional Application No. 63/545,692, filed Oct. 25, 2023, and entitled, "High Performance Electrolyte for Electrochemical Energy Storage Devices, and Methods of Producing the Same," and U.S. Provisional Application No. 63/633,426, filed Apr. 12, 2024, and entitled "High Performance Electrolyte for Electrochemical Energy Storage Devices, and Methods of Producing the Same," the entire disclosures of which are hereby incorporated by reference herein.

STATEMENT OF GOVERNMENT SUPPORT

This invention was made with government support under Award No. DE-0006250 awarded by the U.S. Department of Energy. The government has certain rights in the invention.

TECHNICAL FIELD

Embodiments described herein relate to electrolyte solutions for incorporation into batteries.

BACKGROUND

The accelerated development of electrified transportation and aviation as well as a modernized grid with integrated renewable energy demands for high energy and high power rechargeable batteries. Lithium metal batteries (LMBs) represent an advanced class of rechargeable battery chemistries that can potentially outperform lithium-ion batteries. However, electrolytes used in such batteries often have low conductivities and poor electrochemical stability and inadequate low-temperature performance. The interactions between liquid molecules and electrolyte salts are very difficult to tune. An understanding of salt and solvent behavior at the molecular level can aid in production of high performance LMBs.

SUMMARY

Systems, devices, and methods described herein relate to electrolyte formulations and the incorporation thereof into batteries. In some aspects, an electrolyte composition can comprise between about 10 wt % and about 42 wt % of an electrolyte solvent, between about 13 wt % and about 59 wt % of a fluoroether (FE) and about 22 wt % to about 43 wt % of a salt including bis(fluorosulfonyl)imide ions. In some embodiments, the electrolyte solvent is about 13 wt % and about 39 wt % of the composition. In some embodiments, the salt includes lithium bis(fluorosulfonyl)imide (LiFSI). In some embodiments, the FE can make up between about 18 wt % and about 36 wt % of the composition. In some embodiments, the composition can include between about 0.5 wt % and about 1.5 wt % of a first additive. In some embodiments, the composition can include between about 0.5 wt % and about 5 wt % of a second additive. In some embodiments, the composition can include between about 0.5 wt % and about 5 wt % polyethylene glycol.

In some embodiments, an electrochemical cell includes: a lithium metal anode; a cathode; a separator disposed between the anode and the cathode; and a liquid electrolyte, the liquid electrolyte comprising: about 10 wt % to about 42 wt % of an electrolyte solvent; about 13 wt % to about 59 wt % of a fluoroether (FE); and about 22 wt % to about 43 wt % of a salt including bis(fluorosulfonyl)imide ions.

In some embodiments, a method includes: forming a first electrolyte solution, the first electrolyte solution including about 26 wt % to about 70 wt % of a first salt including bis(fluorosulfonyl)imide ions and about 30 wt % to about 74 wt % of a first electrolyte solvent; forming a second electrolyte solution, the second electrolyte solution including about 2 wt % to about 42 wt % of a second salt and about 38 wt % to about 98 wt % of a second electrolyte solvent different from the first electrolyte solvent; combining the first electrolyte solution and the second electrolyte solution to form the electrolyte such that the electrolyte includes about 10 wt % to about 90 wt % of the first electrolyte solution and about 10 wt % to about 90 wt % of the second electrolyte solution.

BRIEF DESCRIPTION OF THE DRAWINGS

FIG. 13 shows conductivities of a first solution, a second solution, and electrolyte formed by mixing the first solution and the second solution, according to an embodiment.

DETAILED DESCRIPTION

Figure 1:
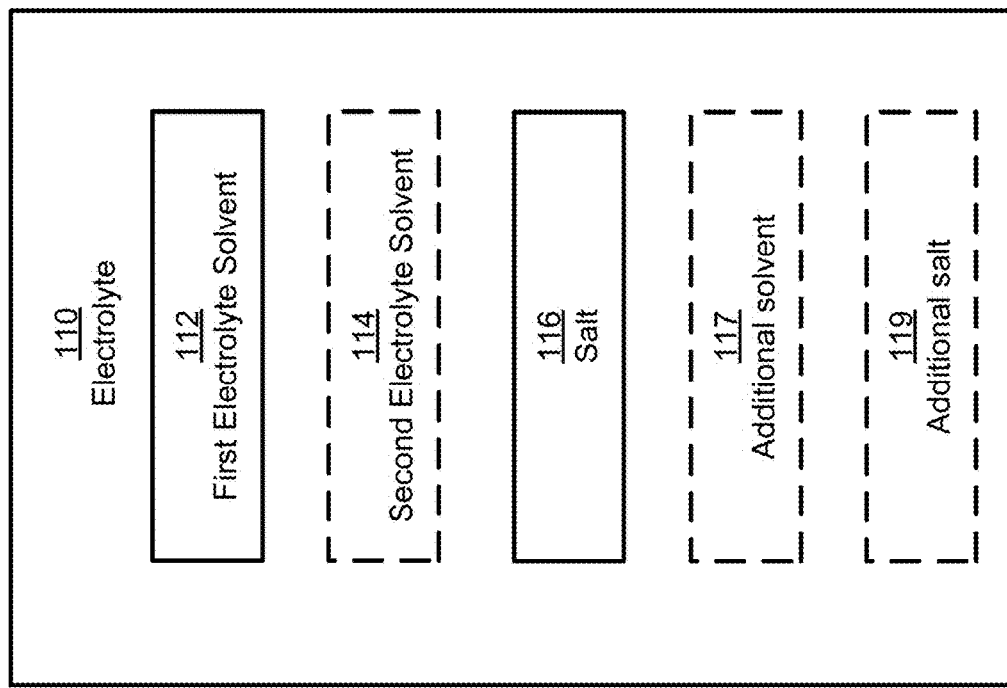
FIG. 1 is a block diagram of an electrolyte composition, according to an embodiment.

LMBs include a set of negative and positive electrodes, with the anode comprising lithium metal, and an electrolyte through which a cation commutes from one electrode to another electrode during charge and discharge. Similar to lithium ion batteries, electrolytes for LMBs play an important role in the cell performance, as well as the practicality and commerciality of the cell. Unlike the carbonaceous material used in the electrodes of lithium ion batteries, a lithium metal anode is more electrochemically reactive with electrolyte and can form dendrites during operation. This can lead to poor cycle life, power capability, and safety concerns. Prior electrolyte development efforts have made limited progress in addressing the challenges of LMBs.

Some LMBs incorporate solid-state electrolytes. However, solid-state electrolytes have several drawbacks. Solid-state electrolytes have low ionic conductivity and accordingly perform poorly. They also have high interfacial resistance due to solid-solid contact in the electrochemical cell. They do not perform well with fast charging. They do not generally perform well at low temperatures. Material synthesis of solid-state electrolytes is often more expensive than other electrolytes. Cell production with solid-state electrolytes is also often more expensive. Solid-state electrolytes are also generally incompatible with existing manufacturing infrastructure. The safety benefits from solid-state electrolytes are fairly minimal. Such electrolytes are operable in a relatively narrow voltage stability window, depending on electrolyte chemistry. The gain in energy density is also fairly modest and dependent on the electrolyte. Finally, cells with solid-state electrolyte often have poor mechanical strength and are prone to dendrite formation and short-circuiting.

Some LMBs incorporate polymer electrolytes. Polymer electrolytes have low ionic conductivity and therefore, low power performance. Polymer electrolytes have poor fast charge performance, perform poorly in low temperature environments, and can require redesigning a manufacturing infrastructure for implementation. Safety improvements from such electrolytes are also debatable.

Electrolytes described herein can be used with LMBs as well as other lithium-ion batteries (LIBs). In some embodiments, electrolytes described herein can be incorporated into lithium cobalt oxide batteries, lithium nickel manganese cobalt oxide batteries, lithium nickel cobalt aluminum oxide batteries, lithium manganese oxide batteries, lithium cobalt phosphate batteries, lithium nickel phosphate batteries, lithium iron phosphate batteries, lithium manganese phosphate batteries, lithium manganese iron phosphate batteries, and/or lithium titanate batteries.

Conventional liquid electrolytes also have several drawbacks. They have an unstable interphase with lithium metal, leading to dendrite formation and electrolyte consumption. They can have poor cycle life, poor power performance, poor fast charge performance, poor low temperature performance, and can be flammable. Further, conventional liquid electrolytes have poor processibility due to volatility.

Advanced liquid electrolytes (e.g., highly concentrated electrolytes (HCE) and localized highly concentrated electrolytes (LHCE)) have low ionic conductivity and therefore poor power performance. Poor separator and electrode wetting are issues for HCE. Advanced liquid electrolytes are also expensive. LHCE are consumed quickly due to the presence of fluorinated diluents. They also exhibit moderate to poor fast charge capabilities due to high interfacial impedance. Poor processibility is also an issue due to the volatility of the LHCE. Advanced liquid electrolytes also perform poorly at low temperatures.

Developing an electrolyte can address the aforementioned challenges and meet all performance expectations (e.g., energy density, cycle life, power, fast charge, low temperature, safety, stable interphase, etc.) can greatly improve cell performance. Such an electrolyte that fits within existing manufacturing infrastructure would provide additional convenience in implementation.

Due to the unique molecular and solvation structure of electrolytes described herein, these electrolytes can yield a significant improvement in LMB performance. Embodiments described herein outperform state-of-the-art electrolytes in many aspects, while maintaining manufacturing compatibility with existing infrastructure (both semi-solid and conventional electrodes). Advantages of such electrolytes are described as follows.

First, electrolytes described herein have higher conductivity (i.e., at least about 7 mS/cm) than state-of-the-art liquid electrolyte capacities reported at room temperature, which are often between 1 mS/cm and 6 mS/cm. High ionic conductivity ensures uniform lithium ion flux during lithium stripping and/or plating, and can improve cathode capacity utilization at higher charge and discharge rates.

Second, cells including electrolytes described herein have reduced interfacial resistance. The solvation structure of electrolytes described herein yields a 2-3 times lower interfacial resistance than cells of the current state of the art, while maintaining a stable solid-electrolyte-interphase (SEI). Electrolytes described herein enable fast charge-transfer and low solvation/de-solvation energy. As a result, electrochemical cells electrolytes described herein show much improved capacity utilization at low temperatures and different discharge rates.

Third, cells including electrolytes described herein have excellent electrolyte retention and capacity retention. Cells including electrolytes described herein can retain at least about 95% and at least about 80% capacity at C5 and C4, respectively, at 0° C. (substantially higher than the >25% baseline standard).

Fourth, electrolytes described herein have improved volatility and processibility. Hydrogen bonds and interactions between solvents and alkaline salt lead to the low volatility nature of the electrolytes described herein. Such interactions are important for the quality of slurry electrode processing, as electrolyte loss due to evaporation (and corresponding electrode cracking and curling) can be prevented. Low electrolyte volatility can also benefit traditional cell manufacturing, as less electrolyte loss would occur during the electrolyte injection and vacuum scaling. The small dimensions of solvent molecules can also facilitate their diffusion and positively contribute to the rheological behavior of the slurry by lowering the yield stress at high solid loading. Unlike highly viscous concentrated electrolytes, the electrolytes described herein can improve electrolyte wettability with separator materials (e.g., polyethylene). Electrolytes described herein can have low volatility and can enable large scale electrolyte spraying processes.

Fifth, electrolytes described herein enable fast charging. Due to the high conductivity and low interfacial resistance the electrolyte can significantly improve the fast charge capability of LMBs without compromising cycling stability.

Sixth, cells with electrolytes described herein can include a conductive and stable interphase. This can enable stable cycling at a high current density and areal loading necessary for high energy density and power applications.

Seventh, electrolytes described herein can be used with common or mainstream materials in the industry.

Finally, electrolytes described herein can be relatively low cost. Unlike HCE and LHCE, electrolytes described herein can have low salt concentrations (e.g., about 2 M to about 3 M), compared to the >4 M concentration in HCE. The fluorinated solvent weight fraction of electrolytes described herein can be less than about 20% without negatively impacting performance, while a minimum of about 40 wt % and up to about 60 wt % may be required for LHCE.

In some embodiments, electrodes described herein can include conventional solid electrodes. In some embodiments, the solid electrodes can include binders. In some embodiments, electrodes described herein can include semi-solid electrodes. Semi-solid electrodes described herein can be made: (1) thicker (e.g., greater than 100 µm-up to 2,000 µm or even greater) due to the reduced tortuosity and higher electronic conductivity of the semi-solid electrode, (ii) with higher loadings of active materials, and (iii) with a simplified manufacturing process utilizing less equipment. These relatively thick semi-solid electrodes decrease the volume, mass and cost contributions of inactive components with respect to active components, thereby enhancing the commercial appeal of batteries made with the semi-solid electrodes.

In some embodiments, the semi-solid electrodes described herein are binderless and/or do not use binders that are used in conventional battery manufacturing. Instead, the volume of the electrode normally occupied by binders in conventional electrodes, is now occupied by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes. Since the semi-solid electrodes described herein, can be made substantially thicker than conventional electrodes, the ratio of active materials (i.e., the semi-solid cathode and/or anode) to inactive materials (i.e., the current collector and separator) can be much higher in a battery formed from electrochemical cell stacks that include semi-solid electrodes relative to a similar battery formed form electrochemical cell stacks that include conventional electrodes. This substantially increases the overall charge capacity and energy density of a battery that includes the semi-solid electrodes described herein.

In some embodiments, the electrode materials described herein can include a flowable semi-solid or condensed liquid composition. In some embodiments, the electrode materials described herein can be binderless or substantially free of binder. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive particles are co-suspended in an electrolyte to produce a semi-solid electrode. Examples of battery architectures utilizing semi-solid electrodes are described in International Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "semi-solid" refers to a material that is a mixture of liquid and solid phases, for example, such as a particle suspension, a slurry, a colloidal suspension, an emulsion, a gel, or a micelle.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles and through the thickness and length of the electrode. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

As used herein, the terms "energy density" and "volumetric energy density" refer to the amount of energy (e.g., MJ) stored in an electrochemical cell per unit volume (e.g., L), including the electrodes, the separator, the electrolyte, the current collectors, and cell packaging. Unless otherwise noted, energy density and volumetric density include cell packaging.

FIG. 1 is a block diagram of an electrolyte 110, according to an embodiment. As shown, the electrolyte 110 can include a first electrolyte solvent (e.g., dimethoxyethane (DME)) 112, optionally, a second electrolyte solvent (e.g., ether 114 such as BFE), and a salt including bis(fluorosulfonyl)imide ions 116 (e.g., LiFSI, or NaFSI). The proportions of the first electrolyte solvent and the second electrolyte solvent can be selected for facilitating proper interactions between the molecules and can be electrode dependent.

In some embodiments, the first electrolyte solvent 112 (e.g., DME) can make up at least about 10 wt %, at least about 11 wt %, at least about 12 wt %, at least about 13 wt %, at least about 14 wt %, at least about 15 wt %, at least about 16 wt %, at least about 17 wt %, at least about 18 wt %, at least about 19 wt %, at least about 20 wt %, at least about 21 wt %, at least about 22 wt %, at least about 23 wt %, at least about 24 wt %, at least about 25 wt %, at least about 26 wt %, at least about 27 wt %, at least about 28 wt %, at least about 29 wt %, at least about 30 wt %, at least about 31 wt %, at least about 32 wt %, at least about 33 wt %, at least about 34 wt %, at least about 35 wt %, at least about 36 wt %, at least about 37 wt %, at least about 38 wt %, at least about 39 wt %, at least about 40 wt %, at least about 41 wt %, or at least about 42 wt % of the electrolyte 110. In some embodiments, the first electrolyte solvent 112 can make up no more than about 42 wt %, no more than about 41 wt %, no more than about 40 wt %, no more than about 39 wt %, no more than about 38 wt %, no more than about 37 wt %, no more than about 36 wt %, no more than about 35 wt %, no more than about 34 wt %, no more than about 33 wt %, no more than about 32 wt %, no more than about 31 wt %, no more than about 30 wt %, no more than about 29 wt %, no more than about 28 wt %, no more than about 27 wt %, no more than about 26 wt %, no more than about 25 wt %, no more than about 24 wt %, no more than about 23 wt %, no more than about 22 wt %, no more than about 21 wt %, no more than about 20 wt %, no more than about 19 wt %, no more than about 18 wt %, no more than about 17 wt %, no more than about 16 wt %, no more than about 15 wt %, no more than about 14 wt %, no more than about 13 wt %, no more than about 12 wt %, or no more than about 11 wt % of the electrolyte 110. Combinations of the above-referenced weight percentages are also possible (e.g., at least about 10 wt % and no more than about 42 wt % or at least about 13 wt % and no more than about 39 wt %), inclusive of all values and ranges therebetween. In some embodiments, the first electrolyte solvent 112 can make up about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, or about 42 wt % of the electrolyte 110.

In some embodiments, the second electrolyte solvent 114 can include an ether 114 such as a fluoroether. In some embodiments, the second electrolyte solvent 114 can include bis(2-fluoroethyl) ether (BFE). In some embodiments, the second electrolyte solvent 114 can have the following structure:

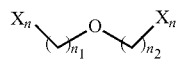

Where $n_1$ and $n_2$ can each have values between 1 and 5, X=F, Br, Cl, or I, n=1-5 (per molecule).

In some embodiments, $n_1$ and/or $n_2$ can be 1, 2, 3, 4, or 5. In some embodiments, n can be 1, 2, 3, 4, or 5.

In some embodiments, the second electrolyte solvent 114 can make up at least about 13 wt %, at least about 14 wt %, at least about 15 wt %, at least about 16 wt %, at least about 17 wt %, at least about 18 wt %, at least about 19 wt %, at least about 20 wt %, at least about 21 wt %, at least about 22 wt %, at least about 23 wt %, at least about 24 wt %, at least about 25 wt %, at least about 26 wt %, at least about 27 wt %, at least about 28 wt %, at least about 29 wt %, at least about 30 wt %, at least about 31 wt %, at least about 32 wt %, at least about 33 wt %, at least about 34 wt %, at least about 35 wt %, at least about 36 wt %, at least about 37 wt %, at least about 38 wt %, at least about 39 wt %, at least about 40 wt %, at least about 41 wt %, at least about 42 wt %, at least about 43 wt %, at least about 44 wt %, at least about 45 wt %, at least about 46 wt %, at least about 47 wt %, at least about 48 wt %, at least about 49 wt %, at least about 50 wt %, at least about 51 wt %, at least about 52 wt %, at least about 53 wt %, at least about 54 wt %, at least about 55 wt %, at least about 56 wt %, at least about 57 wt %, at least about 58 wt %, or at least about 59 wt % of the electrolyte 110. In some embodiments, the second electrolyte solvent 114 can make up no more than about 59 wt %, no more than about 58 wt %, no more than about 57 wt %, no more than about 56 wt %, no more than about 55 wt %, no more than about 54 wt %, no more than about 53 wt %, no more than about 52 wt %, no more than about 51 wt %, no more than about 50 wt %, no more than about 49 wt %, no more than about 48 wt %, no more than about 47 wt %, no more than about 46 wt %, no more than about 45 wt %, no more than about 44 wt %, no more than about 43 wt %, no more than about 42 wt %, no more than about 41 wt %, no more than about 40 wt %, no more than about 39 wt %, no more than about 38 wt, no more than about 37 wt %, no more than about 36 wt %, no more than about 35 wt %, no more than about 34 wt %, no more than about 33 wt %, no more than about 32 wt %, no more than about 31 wt %, no more than about 30 wt %, no more than about 29 wt %, no more than about 28 wt %, no more than about 27 wt %, no more than about 26 wt %, no more than about 25 wt %, no more than about 24 wt %, no more than about 23 wt %, no more than about 22 wt %, no more than about 21 wt %, no more than about 20 wt %, no more than about 19 wt %, no more than about 18 wt %, no more than about 17 wt %, no more than about 16 wt %, no more than about 15 wt %, no more than about 14 wt %, or no more than about 13 wt % of the electrolyte 110. Combinations of the above-referenced weight percentages are also possible (e.g., at least about 13 wt % and no more than about 59 wt % or at least about 18 wt % and no more than about 36 wt %), inclusive of all values and ranges therebetween. In some embodiments, the second electrolyte solvent 114 can make up about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %), about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, or about 59 wt % of the electrolyte 110.

The salt including 116 the bis(fluorosulfonyl)imide ions can include an electrolyte salt included in the electrolyte 110. In some embodiments, the salt 116 can include lithium bis(fluorosulfonyl)imide (LIFSI). In some embodiments, the salt 116 can include sodium bis(fluorosulfonyl)imide (NaFSI). In some embodiments, the salt 116 can have a concentration in the electrolyte 110 of at least about 2 M, at least about 2.1 M, at least about 2.2 M, at least about 2.3 M, at least about 2.4 M, at least about 2.5 M, at least about 2.6 M, at least about 2.7 M, at least about 2.8 M, or at least about 2.9 M. In some embodiments, the salt 116 can have a concentration in the electrolyte 110 of no more than about 3 M, no more than about 2.9 M, no more than about 2.8 M, no more than about 2.7 M, no more than about 2.6 M, no more than about 2.5 M, no more than about 2.4 M, no more than about 2.3 M, no more than about 2.2 M, or no more than about 2.1 M. Combinations of the above-referenced concentrations are also possible (e.g., at least about 2 M and no more than about 3 M or at least about 2.2 M and no more than about 2.8 M), inclusive of all values and ranges therebetween. In some embodiments, the salt 116 can have a concentration in the electrolyte 110 of about 2 M, about 2.1 M, about 2.2 M, about 2.3 M, about 2.4 M, about 2.5 M, about 2.6 M, about 2.7 M, about 2.8 M, about 2.9 M, or about 3 M.

In some embodiments, the salt 116 can make up at least about 22 wt %, at least about 23 wt %, at least about 24 wt %, at least about 25 wt %, at least about 26 wt %, at least about 27 wt %, 28 wt %, at least about 29 wt %, at least about 30 wt %, at least about 31 wt %, at least about 32 wt %, at least about 33 wt %, at least about 34 wt %, at least about 35 wt %, at least about 36 wt %, at least about 37 wt %, at least about 38 wt %, at least about 39 wt %, at least about 40 wt %, at least about 41 wt %, at least about 42 wt %, or at least about 43 wt % of the electrolyte 110. In some embodiments, the salt 116 can make up no more than about 45 wt %, no more than about 44 wt %, no more than about 43 wt %, no more than about 42 wt %, no more than about 41 wt %, no more than about 40 wt %, no more than about 39 wt %, no more than about 38 wt %, no more than about 37 wt %, no more than about 36 wt %, no more than about 35 wt %, no more than about 34 wt %, no more than about 33 wt %, no more than about 32 wt %, no more than about 31 wt %, no more than about 34 wt %, no more than about 35 wt %, no more than about 36 wt %, no more than about 37 wt %, no more than about 38 wt %, no more than about 39 wt %, no more than about 40 wt %, no more than about 41 wt %, no more than about 42 wt % or no more than about 43 wt %. Combinations of the above-referenced weight percentages are also possible (e.g., at least about 22 wt % and no more than about 43 wt % or at least about 28 wt % and no more than about 43 wt %), inclusive of all values and ranges therebetween. In some embodiments, the 116 can make up about 28 wt %, about 29 wt %, 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, or about 45 wt % of the electrolyte 110.

In some embodiments, the salt 116 can include a primary salt and a secondary salt. For example, the primary salt may include a bis(fluorosulfonyl)imide salt (e.g., LiFSI or NaFSI), and the secondary salt may include a different bis(fluorosulfonyl)imide salt or another salt. In some embodiments, the secondary salt may include LiBF4 or any of the additional salts 119, as described herein. In some embodiments, the secondary salt may make up at least about 4 wt %, at least about 4.5 wt %, at least about 5 wt %, at least about 5.5 wt %, at least about 6 wt %, at least about 6.5 wt %, at least about 7 wt %, at least about 7.5 wt %, at least about 8 wt %, at least about 8.5 wt %, at least about 9 wt %, at least about 9.5 wt %, at least about 10 wt %, at least about 11 wt %, at least about 12 wt %, at least about 13 wt %, at least about 14 wt %, at least about 15 wt %, at least about 16 wt %, at least about 17 wt %, or at least about 18 wt % of the electrolyte 110. In some embodiments, the secondary salt may make up no more than about 19 wt %, no more than about 18 wt %, no more than about 17 wt %, no more than about 16 wt %, no more than about 15 wt %, no more than about 14 wt %, no more than about 12 wt %, no more than about 11 wt %, no more than about 10 wt %, no more than about 9 wt %, no more than about 8 wt %, no more than about 7 wt %, no more than about 6 wt %, or no more than about 5 wt % of the electrolyte solution. Combinations of the above-referenced weight percentages are also possible (e.g., at least about 4 wt % and no more than about 19 wt % or at least about 4.5 wt % and no more than about 15 wt %), inclusive of all values and ranges therebetween. In some embodiments, the 116 can make up about 4 wt %, about 4.5 wt %, 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 11 wt %, about 12 wt %, about 13 wt %, about 14 wt %, about 15 wt %, about 16 wt %, about 17 wt %, about 18 wt %, or about 19 wt % of the electrolyte 110, inclusive.

In some embodiments, the electrolyte 110 can include a first additive and/or a second additive. In some embodiments, the electrolyte 110 can include at least about 0.5 wt %, at least about 0.6 wt %, at least about 0.7 wt %, at least about 0.8 wt %, at least about 0.9 wt %, at least about 1 wt %, at least about 1.1 wt %, at least about 1.2 wt %, at least about 1.3 wt %, or at least about 1.4 wt % of the first additive. In some embodiments, the electrolyte 110 can include no more than about 1.5 wt %, no more than about 1.4 wt %, no more than about 1.3 wt %, no more than about 1.2 wt %, no more than about 1.1 wt %, no more than about 1 wt %, no more than about 0.9 wt %, no more than about 0.8 wt %, no more than about 0.7 wt %, or no more than about 0.6 wt % of the first additive. Combinations of the above-referenced weight percentages are also possible (e.g., at least about 0.5 wt % and no more than about 1.5 wt % or at least about 0.8 wt % and no more than about 1.2 wt %), inclusive of all values and ranges therebetween. In some embodiments, the electrolyte 110 can include about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, or about 1.5 wt %. Any suitable first additive can be used including, but not limited to lithium bis(fluorosulfonyl)imide ($F_2LiNO_4S_2$), lithium bis(trifluoromethylsulfonyl)imide ($LiC_2F_6NO_4S_2$), lithium bis(oxalato) borate, lithium hexafluorophosphate ($LiPF_6$), lithium hexafluoroarsenate ($LiAsF_6$), lithium bis(trifluoromethane) sulfonimide ($LiN(SO_2CF_3)_2$), lithium trifluoromethanesulfonate ($LiCF_3SO_3$), lithium perchlorate ($LiClO_4$), lithium difluoro oxalato borate (LiBF2 ($C_2O_4$)), lithium iodide (LiI), lithium bromide (LiBr), lithium chloride (LiCl), lithium hydroxide (LiOH), lithium nitrate ($LiNO_3$), lithium 2-trifluoromethyl-4,5-dicyanoimidazole (LiTDI), lithium sulfate ($Li_2SO_4$), lithium tetrafluoroborate ($LiBF_4$), lithium difluorophosphate ($LiPO_2F_2$), any other suitable first additive or any suitable combination thereof.

In some embodiments, the electrolyte 110 can include at least about 0.5 wt %, at least about 1 wt %, at least about 1.5 wt %, at least about 2 wt %, at least about 2.5 wt %, at least about 3 wt %, at least about 3.5 wt %, at least about 4 wt %, or at least about 4.5 wt % of a second additive (e.g., trioxane). In some embodiments, the electrolyte 110 can include no more than about 5 wt %, no more than about 4.5 wt %, no more than about 4 wt %, no more than about 3.5 wt %, no more than about 3 wt %, no more than about 2.5 wt %, no more than about 2 wt %, no more than about 1.5 wt %, or no more than about 1 wt % of the second additive (e.g., trioxane). Combinations of the above-referenced weight percentages are also possible (e.g., at least about 0.5 wt % and no more than about 5 wt % or at least about 2 wt % and no more than about 4 wt %), inclusive of all values and ranges therebetween. In some embodiments, the electrolyte 110 can include about 0.5 wt %, about 1 wt %, about 1.5 wt %, about 2 wt %, about 2.5 wt %, about 3 wt %, about 3.5 wt %, about 4 wt %, about 4.5 wt %, or about 5 wt % of the second additive. Any suitable second additive can be used including, but not limited to tris-(trimethylsilyl)phosphate (TMSP), trimethoxy (3,3,3-trifluoropropyl) silane (TTS), pentafluorophenyltriethoxysilane (TPS), boric acid tris(trimethylsilyl) ester (TMSB), tris-(pentafluorophenyl) silane (TPFPS), 1,10-sulfonyldiimidazole (SDM), trioxane, lithium difluorophosphate, lithium difluoro oxalato borate, lithium nitrate, (pentafluorophenyl)diphenylphosphine (PFPDPP), cetyltrimethylammonium bromide (CTAB), sodium dodecyl sulfate (SDS), polyethylene-glycol (PEG-8000), and thiourea (TU), benzotriazole (BTA), thiourea (CH4N2S), sodium dodecyl benzene sulfonate (SDBS), LiTFSI, poly(vinyl alcohol) (PVA), polyethylene glycol (PEG), carboxymethyl cellulose (CMC), or any combination thereof.

In some embodiments, the electrolyte 110 can include optionally, include an additional solvent 117 included in the electrolyte 110 in addition to the first electrolyte solvent 112. In some embodiments, the first electrolyte solvent 112 or the additional solvent 117 can include a polar solvent. In some embodiments, the polar solvent can include 1,2-dimethoxyethane, bis-(2-fluoro-ethyl)-ether, 1,2-diethoxyethane, bis(2-methoxyethyl) ether, triethylene glycol dimethyl ether, tetraethylene glycol dimethyl ether, diethyl ether, dipropyl ether, 1,2-dipropoxyethane, dibutoxyethane, 1,2-diethoxypropane, dimethyl carbonate, 1,3-dioxolane, 1,4-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, fluoroethylene carbonate, tetrahydropyran, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, water, carbonate, dimethyl carbonate, 1,3-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, and/or fluoroethylene carbonate.

In some embodiments, the first electrolyte solvent 112 or the additional solvent 117 can include a non-polar solvent. In some embodiments, the non-polar solvent can include fluoroether, fluorobutane, 1,1,2,2-tetrafluoroethyl-2,2,3,3-tetrafluoropropyl ether, bis(2,2,2-trifluoroethyl) ether, 1,1,2,2,-tetrafluoroethyl-2,2,2-trifluoroothyl ether, tris(2,2,2-trifluoroethyl) orthoformate, pentafluoroethyl 2,2,2-trifluoroethyl ether, 2,2,3,3,4,4,5,5-octafluoro-1-pentanol, methoxynonafluorobutane, ethoxynonafluorobutane, 2,2,2-trifluoroethyl nonafluorobutanessulfonate, 1,1,2,2-tetrafluoroethyl-2,2,3,3-tetrafluoropropyl ether, bis(2,2,2-trifluoroethyl) ether, 1,1,2,2,-tetrafluoroethyl-2,2,2-trifluoroethyl ether, tris(2,2,2-trifluoroethyl) orthoformate, pentafluoroethyl 2,2,2-trifluoroethyl ether, 2,2,3,3,4,4,5,5-octafluoro-1-pentanol, 3,3,4,4,5,5-hexafluorotetrahydropyran, or any combination thereof.

In some embodiments, the electrolyte 110 can optionally, include an additional salt 119. In some embodiments, the additional salt 119 can include lithium bis(fluorosulfonyl) imide ($F_2LiNO_4S_2$), lithium bis(trifluoromethylsulfonyl)imide ($LiC_2F_6NO_4S_2$), lithium bis(oxalato) borate, lithium hexafluorophosphate ($LiPF_6$), lithium hexafluoroarsenate ($LiAsF_6$), lithium bis(trifluoromethane) sulfonimide (LiN($SO_2CF_3$)$_2$), lithium trifluoromethanesulfonate ($LiCF_3SO_3$), lithium perchlorate ($LiClO_4$), lithium difluoro oxalato borate ($LiBF_2(C_2O_4)$), lithium iodide (LiI), lithium bromide (LiBr), lithium chloride (LiCl), lithium hydroxide (LiOH), lithium nitrate ($LiNO_3$), lithium 2-trifluoromethyl-4,5-dicyanoimidazole (LITDI), lithium sulfate ($Li_2SO_4$), lithium tetrafluoroborate ($LiBF_4$), and/or lithium difluorophosphate ($LiPO_2F_2$). In some embodiments, the additional salt 119 can include sodium, potassium, magnesium, zinc, cesium, indium, tin, antimony, silicon, nickel, or cobalt analogues of the aforementioned salts. In some embodiments in which the salt 116 includes an first alkali metal salt (e.g., a lithium salt), and the additional salt 119 includes a second alkali metal salt (e.g., a sodium salt) different from the first alkali metal salt, the additional salt 119 may make up less than about 5 wt % of the electrolyte 110 (e.g., 4.9, 4.8, 4.7, 4.6, 4.5, 4.0, 3.5, 3.0, 2.5, 2.0, 1.5, 1.0, 0.5, 0.1, 0.05, or 0.01 wt %, inclusive).

In some embodiments, the electrolyte 110 can include solvent-based additives. In some embodiments, the electrolyte 110 can include tris-(trimethylsilyl)phosphate (TMSP), trimethoxy (3,3,3-trifluoropropyl) silane (TTS), pentafluorophenyltriethoxysilane (TPS), boric acid tris(trimethylsilyl) ester (TMSB), tris-(pentafluorophenyl) silane (TPFPS), 1,10-sulfonyldiimidazole (SDM), trioxane, lithium difluorophosphate, lithium difluoro oxalato borate, lithium nitrate, (pentafluorophenyl)diphenylphosphine (PFPDPP), cetyltrimethylammonium bromide (CTAB), sodium dodecyl sulfate (SDS), polyethylene-glycol (PEG-8000), and thiourea (TU), benzotriazole (BTA), thiourea (CH4N2S), sodium dodecyl benzene sulfonate (SDBS), LiTFSI, poly(vinyl alcohol) (PVA), polyethylene glycol (PEG), carboxymethyl cellulose (CMC), or any combination thereof.

In some embodiments, the electrolyte 110 can include nonflammable solvents. In some embodiments, the electrolyte 110 can include organic phosphates, phosphites, phosphonates, phosphoramides include substituted and unsubstituted aliphatic and aryl phosphates, phosphites, phosphonates, and phosphoramides. The phosphazenes may be organic or inorganic. Exemplary solvents include, tributyl phosphate, triphenyl phosphate, tris(2,2,2-trifluoroethyl) phosphate, bis(2,2,2-trifluoroethyl) methyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl)methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), or combinations thereof. In some embodiments, the electrolyte 110 can include water as a solvent.

In some embodiments, the electrolyte 110 can include polymers, polyvinylidene fluoride (PVDF), poly(vinylidene fluoride-hexafluoropropylene) (PVDF-HFP), polyimide (PI), CMC, poly(acrylic acid) (PAA), PEG, polyaniline (PANI) polyacrylonitrile (PAN), poly(methyl methacrylate) (PMMA), polypropylene carbonate (PPC), polyvinylpyrrolidone (PVP), polydimethylsiloxane (PDMS). In some embodiments, the electrolyte 110 can be mixed with a solid-state electrolyte. In some embodiments, the electrolyte 110 can include a solvent with an electrolyte impermeable yet ion conductive separator, which can include a class of solid-state electrolyte. In some embodiments, the solid-state electrolyte can include oxide-based solid electrolyte materials including a garnet structure, a perovskite structure, a phosphate-based Lithium Super Ionic Conductor (LISICON) structure, a glass structure such as $La_{0.5}Ti_{0.34}TiO_{2.94}$, $Li_{1.3}Al_{0.3}Ti_{1.7}(PO_4)_3$ (LATP), $Li_{1.3}Al_{0.3}Ti_{1.7}(PO_4)_3$, $Li_{1.4}Al_{0.4}T_{1.6}(PO_4)_3$, $Li_7La_3Zr_2O_{12}$, $Li_{6.66}La_3Zr_{1.6}Ta_{0.4}O_{12.9}$ (LLZO), $50Li_4SiO_4 \cdot 50Li_3BO_3$, $Li_{2.9}PO_{3.3}N_{0.46}$ (lithium phosphorousoxynitride, LiPON), $Li_{3.6}Si_{0.6}P_{0.4}O_4$, $Li_3BN_2$, $Li_3BO_3—Li_2SO_4$, $Li_3BO_3—Li_2SO_4—Li_2CO_3$ (LIBSCO, pseudoternary system), and/or sulfide contained solid electrolyte including a thio-LISICON structure, a glassy structure and a glass-ceramic structure such as $Li_{1.07}Al_{0.69}Ti_{1.46}(PO_4)_3$, $Li_{1.5}Al_{0.5}Ge_{1.5}(PO_4)_3$, $Li_{10}GeP_2S_{12}$ (LGPS), $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 30P_2S_5$, $50Li_2S \cdot 50GeS_2$, $Li_2P_3S_{11}$, $Li_{3.25}P_{0.95}S_4$, and $Li_{9.54}Si_{1.74}P_{1.44}S_{11.7}C_{10.3}$, and/or closo-type complex hydride solid electrolyte such as $LiBH_4—LiI$, $LiBH_4—LiNH_2$, $LiBH_4—P_2S_5$, $Li(CB_xH_{x+1})—LiI$ (where x is an integer) like $Li(CB_9H_{10})—LiI$, or combinations thereof. In some embodiments, the solid-state electrolyte material can be sulfide-based. In some embodiments, the solid-state electrolyte can include lithium phosphorus sulfide (LPS), $Li_{10}GeP_2S_{12}$ (LGPS), lithium tin phosphorus sulfide (LSPS), and/or $Li_{5.5}PS_{4.5}Cl_{1.5}$ (LPSCI), and/or lithium argyrodite $Li_6PS_5X$ (X=Cl, Br), and/or halide electrolytes $Li_{3-x}M_{1-x}X_6$ (M=Y, Er, In, Yb, Ho, X=Cl, Br, I, F). In some embodiments, the solid-state electrolyte material can include a complex hydride solid electrolyte. In some embodiments, the solid-state electrolyte material can include $LiBH_4—LiI$ and/or $LiBH_4—P_2S_5$. In some embodiments, sodium can replace lithium as the conductive ion in either of the aforementioned solid-state electrolyte materials.

In some embodiments, the electrolyte 110 can include polyethylene glycol (PEG). In some embodiments, the electrolyte 110 can include at least about 0.5 wt %, at least about 1 wt %, at least about 1.5 wt %, at least about 2 wt %, at least about 2.5 wt %, at least about 3 wt %, at least about 3.5 wt %, at least about 4 wt %, or at least about 4.5 wt % PEG. In some embodiments, the electrolyte 110 can include no more than about 5 wt %, no more than about 4.5 wt %, no more than about 4 wt %, no more than about 3.5 wt %, no more than about 3 wt %, no more than about 2.5 wt %, no more than about 2 wt %, no more than about 1.5 wt %, or no more than about 1 wt % PEG. Combinations of the above-referenced PEG weight percentages are also possible (e.g., at least about 0.5 wt % and no more than about 5 wt % or at least about 2 wt % and no more than about 4 wt %), inclusive of all values and ranges therebetween. In some embodiments, the electrolyte 110 can include about 0.5 wt %, about 1 wt %, about 1.5 wt %, about 2 wt %, about 2.5 wt %, about 3 wt %, about 3.5 wt %, about 4 wt %, about 4.5 wt %, or about 5 wt % PEG.

Figure 2:
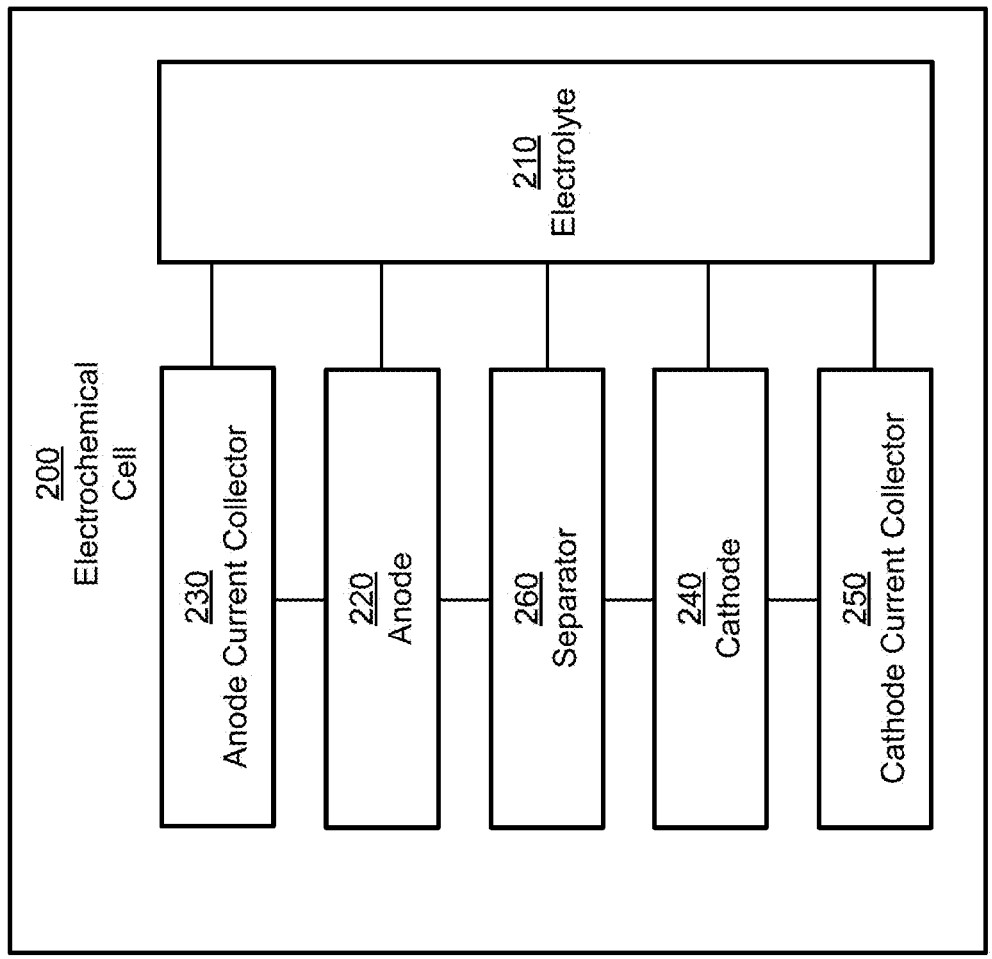
FIG. 2 is a block diagram of an electrochemical cell, according to an embodiment.

FIG. 2 is a block diagram of an electrochemical cell 200, according to an embodiment. As shown, electrochemical cell 200 includes an electrolyte 210, an anode 220 disposed on an anode current collector 230, a cathode 240 disposed on a cathode current collector 250, and a separator 260 disposed between the anode 220 and the cathode 240. In some embodiments, the anode 220 and/or the cathode 240 can include a metal-oxide such as $LiCoO_2$ (lithium cobalt oxide, LCO), $Li(Ni, Mn, Co)O_2$ (lithium nickel manganese cobalt oxide, NMC, which is also referred to as NCM), $LiNi_{0.8}Co_{0.15}Al_{0.05}O_2$ (lithium nickel cobalt aluminum oxide, NCA), a spinel structure, $LiMn_2O_4$ (lithium manganese oxide, LMO, where M is a metal), an olivine structure ($LiMPO_4$, where M is a metal), $LiCoPO_4$ (lithium cobalt phosphate, LCP), $LiNiPO_4$ (lithium nickel phosphate, LNP), $LiFePO_4$ (lithium iron phosphate, LFP), $LiMnPO_4$ (lithium manganese phosphate, LMP), $LiMn_{0.85}Fe_{0.15}PO_4$ (lithium manganese iron phosphate, LMFP), and/or $Li_4Ti_5O_{12}$ (lithium titanate, LTO). In some embodiments, the anode 220 and/or the cathode 240 can include sulfur, $Li_2S$, $SeS_2$, and sulfurized polyacrylonitrile, $O_2$, $Li_2O$, $Li_2O_2$, $FeF_3$, $V_2O_5$, $BiF_3$, $FeS_2$, or any combination thereof.

In some embodiments, lithium can be replaced with sodium in any of the aforementioned electrode materials. In some embodiments, the anode 220 and/or the cathode 240 can include a metal-oxide such as $NaCoO_2$ (sodium cobalt oxide), $Na(Ni, Mn, Co)O_2$ (sodium nickel manganese cobalt oxide), $NaNi_{0.8}Co_{0.15}Al_{0.05}O_2$ (sodium nickel cobalt aluminum oxide), a spinel structure, $NaMn_2O_4$ (sodium manganese oxide), an olivine structure ($NaMPO_4$, where M is a metal), $NaCoPO_4$ (sodium cobalt phosphate), $NaNiPO_4$ (sodium nickel phosphate), $NaFePO_4$ (sodium iron phosphate), $NaMnPO_4$ (sodium manganese phosphate), $NaMn_{0.85}Fe_{0.15}PO_4$ (sodium manganese iron phosphate), and/or $Na_4Ti_5O_{12}$ (sodium titanate). In some embodiments, the anode 220 and/or the cathode 240 can include sodium manganese oxide, sodium vanadium oxide, sodium sulfur compounds, and/or Prussian blue/white analogues.

In some embodiments, lithium can be replaced with potassium in any of the aforementioned electrode materials. In some embodiments, the anode 220 and/or the cathode 240 can include a metal-oxide such as $KCoO_2$ (potassium cobalt oxide), $K(Ni, Mn, Co)O_2$ (potassium nickel manganese cobalt oxide, KNMC), $KNi_{0.8}Co_{0.15}Al_{0.05}O_2$ (potassium nickel cobalt aluminum oxide), a spinel structure, $KMn_2O_4$ (potassium manganese oxide), an olivine structure ($KMPO_4$, where M is a metal), $KCoPO_4$ (potassium cobalt phosphate), $KNiPO_4$ (potassium nickel phosphate), $KFePO_4$ (potassium iron phosphate), $KMnPO_4$ (potassium manganese phosphate), $KMn_{0.85}Fe_{0.15}PO_4$ (potassium manganese iron phosphate), and/or $K_4Ti_5O_{12}$ (potassium titanate). In some embodiments, the anode 220 and/or the cathode 240 can include potassium cobalt oxide (KCO), potassium vanadium oxide, or any combination thereof.

In some embodiments, the anode 220 can include an intercalation based anode material. In some embodiments, the anode 220 can include carbon, graphite, hard carbon, activated carbon, silicon, SiO, Sn, SnS, $SnS_2$, $Sn_3P_4$, Sb, SbS, Bi, P, $TiO_2$, LTO, or any combination thereof. In some embodiments, the anode 220 includes pure lithium metal. In some embodiments, the anode 220 may include graphite. In some embodiments the cathode 240 may include LFP and/or Ketjen black (KB). In some embodiments, the cathode 240 may include high-nickel layered oxide (NMC811). In some embodiments, the cathode 240 may include about 55 vol % LFP and about 0.3 vol % KB. In some embodiments, the cathode 240 may include about 45 vol % NM811 and about 2 vol % KB. In some embodiments, the anode 220 can include an alloy-based anode. In some embodiments, the alloy-based anode can include silicon, SiO, antimony, tin, aluminum, silver, and/or copper. In some embodiments, the anode 220 can include a conversion anode. In some embodiments, the conversion anode can include zinc oxide (ZnO), copper oxide ($Cu_2O$), lithium titanate (LTO), titanium (IV) oxide ($TiO_2$), or any combination thereof.

The electrochemical cell 200 further includes the electrolyte 210. In some embodiments, the electrolyte 210 may include an electrolyte solvent, an ether (e.g., a fluoroether), and a salt including bis(fluorosulfonyl)imide ions (e.g., LiFSI or NaFSI). In some embodiments, the electrolyte includes about 10 wt % to about 42 wt % of the electrolyte solvent, about 13 wt % to about 59 wt % FE (e.g., BFE), and about 22 wt % to about 43 wt % of the salt including bis(fluorosulfonyl)imide ions. In some embodiments, the electrolyte 210 may have a similar composition to electrolyte 110. Therefore, certain details of electrolyte 210 will not be described herein with respect to FIG. 2. In some embodiments, the electrolyte 210 may be injected into the electrochemical cell. In some embodiments, the electrolyte 210 may be pre-mixed with the electroactive materials.

Figure 3:
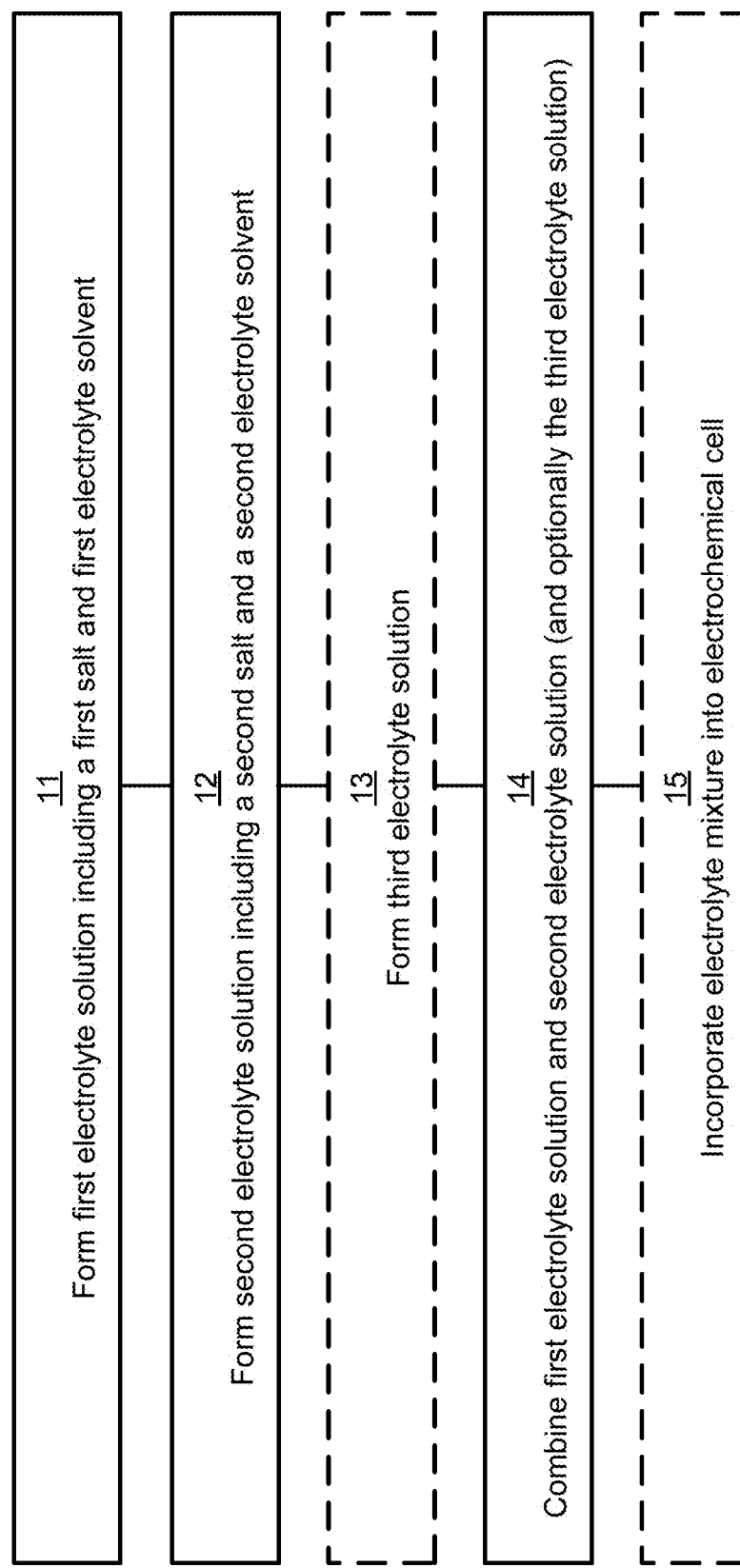
FIG. 3 is a flow diagram of a method of forming an electrolyte, according to an embodiment.

FIG. 3 is a flow diagram of a method 10 of forming an electrolyte, according to an embodiment. As shown, the method 10 includes forming a first electrolyte solution including a first salt including a bis(fluorosulfonyl)imide ion (e.g., LiFSI) and a first electrolyte solvent at step 11. In some embodiments, the bis(fluorosulfonyl)imide salt can include LiFSI. In some embodiments, the bis(fluorosulfonyl)imide salt can include NaFSI. In some embodiments, the bis (fluorosulfonyl)imide salt can include KFSI. In some embodiments, the first electrolyte solution may include the bis(fluorosulfonyl)imide salt with a concentration between about 1.5 M to about 3.5 M, inclusive of all ranges and subranges therebetween. In some embodiments, the first electrolyte solution may include LiFSI with a concentration of 3 M in DME. In some embodiments, the first electrolyte solution may include between about 26 wt % to about 70 wt %, inclusive of the first salt (e.g., LiFSI). In some embodiments the first electrolyte solution may include between about 30 wt % to about 74 wt %, inclusive of the first electrolyte solvent (e.g., DME), or about 42 wt % to about 62 wt % of the first electrolyte solvent. In some embodiments, the first electrolyte solution may include 48 wt % LiFSI and 52 wt % DME (i.e., "Solution 1"). In some embodiments, the first salt and the first electrolyte solvent can include the salt 116 and the first electrolyte solvent 112, as previously described herein.

In some embodiments, the first solution can include a salt in addition to or in lieu of the bis(fluorosulfonyl)imide salt. In some embodiments, the first solution can include lithium bis(fluorosulfonyl)imide ($F_2LiNO_4S_2$), lithium bis(trifluoromethylsulfonyl)imide ($LiC_2F_6NO_4S_2$), lithium bis(oxalato) borate, lithium hexafluorophosphate ($LiPF_6$), lithium hexafluoroarsenate ($LiAsF_6$), lithium bis(trifluoromethane) sulfonimide ($LiN(SO_2CF_3)_2$), lithium trifluoromethanesulfonate ($LiCF_3SO_3$), lithium perchlorate ($LiClO_4$), lithium difluoro oxalato borate ($LiBF_2(C_2O_4)$), lithium iodide (LiI), lithium bromide (LiBr), lithium chloride (LiCl), lithium hydroxide (LiOH), lithium nitrate ($LiNO_3$), lithium 2-trifluoromethyl-4,5-dicyanoimidazole (LiTDI), lithium tetrafluoroborate ($LiBF_4$) and lithium sulfate ($LiSO_4$), and/or lithium difluorophosphate ($LiPO_2F_2$). In some embodiments, the salt can include sodium, potassium, magnesium, zinc, cesium, indium, tin, antimony, silicon, nickel, or cobalt analogues of the aforementioned salts. In some embodiments, the first solution can include water.

In some embodiments, the first solution can include an electrolyte additive. In some embodiments, the electrolyte additive can have a concentration in the first solution of about 0.1 M, about 0.2 M, about 0.3 M, about 0.4 M, about 0.5 M, about 0.6 M, about 0.7 M, about 0.8 M, about 0.9 M, about 1 M, about 2 M, about 3 M, about 4 M, about 5 M, about 6 M, about 7 M, about 8 M, about 9 M, or about 10 M, inclusive of all values and ranges therebetween. In some embodiments, the electrolyte additive can include tris-(trimethylsilyl) phosphate (TMSP), trimethoxy (3,3,3-trifluoropropyl) silane (TTS), pentafluorophenyltriethoxysilane (TPS), trioxane, lithium difluorophosphate, lithium difluoro oxalato borate, lithium nitrate, boric acid tris(trimethylsilyl) ester (TMSB), tris-(pentafluorophenyl) silane (TPFPS), 1,10-sulfonyldiimidazole (SDM), (pentafluorophenyl)diphenylphosphine (PFPDPP), cetyltrimethylammonium bromide (CTAB), sodium dodecyl sulfate (SDS), polyethyleneglycol (PEG-8000), and thiourea (TU), benzotriazole (BTA), thiourea (CH4N2S), sodium dodecyl benzene sulfonate (SDBS), LiTFSI, PVA, PEG, and/or CMC.

At step 12, a second electrolyte solution including a second salt (e.g., LiFSI, or $LiBF_4$) and a second electrolyte solvent (e.g., an ether such as a fluoroether) different from the first electrolyte solvent is formed. In some embodiments, the second electrolyte solvent included in the second electrolyte solution may be bis(2-fluoroethyl) ether (BFE). In some embodiments, the second electrolyte solution may include LiFSI with a concentration between about 0.5 M to about 2.5 M. In some embodiments, the second electrolyte solution can include LiFSI with a concentration of about 2 M in BFE. In some embodiments, the second electrolyte solution may include about 2 wt % to about 42 wt % of the second salt (e.g., LiFSI or $LiBF_4$), or about 9 wt % to about 35 wt % of the second salt. In some embodiments, the second electrolyte solution may include about 38 wt % to about 98 wt % of the second electrolyte solvent (e.g., BFE), or about 65 wt % to about 75 wt % of the second electrolyte solvent. In some embodiments, the second electrolyte solution may include about 28 wt % LiFSI and about 72 wt % BFE (i.e., "Solution 2"). While described as including BFE, the second electrolyte may include any suitable ethers including, but not limited to, those listed with reference to FIG. 1. In some embodiments, the first salt includes LiFSI or NaPSI in a range of about 25 wt % to about 35 wt % of the first electrolyte solution. In some embodiments, the second salt includes LiBF4 in s range of about 9 wt % to about 19 wt % of the second electrolyte solution. In some embodiments, the second electrolyte solvent includes about 80 wt % BFE of the second electrolyte solution.

In some embodiments, the second solution can include a salt in addition to or in lieu of the bis(fluorosulfonyl)imide salt. In some embodiments, the second solution can include lithium bis(fluorosulfonyl)imide ($F_2LiNO_4S_2$), lithium bis (trifluoromethylsulfonyl)imide ($LiC_2F_6NO_4S_2$), lithium bis (oxalato) borate, lithium hexafluorophosphate ($LiPF_6$), lithium hexafluoroarsenate ($LiAsF_6$), lithium bis(trifluoromethane) sulfonimide ($LiN(SO_2CF_3)_2$), lithium trifluoromethanesulfonate ($LiCF_3SO_3$), lithium perchlorate ($LiClO_4$), lithium difluoro oxalato borate ($LiBF_2(C_2O_4)$), lithium iodide (LiI), lithium bromide (LiBr), lithium chloride (LiCl), lithium hydroxide (LiOH), lithium nitrate ($LiNO_3$), lithium 2-trifluoromethyl-4,5-dicyanoimidazole (LiTDI), lithium tetrafluoroborate ($LiBF_4$) and lithium sulfate ($LiSO_4$), and/or lithium difluorophosphate ($LiPO_2F_2$). In some embodiments, the salt can include sodium, potassium, magnesium, zinc, cesium, indium, tin, antimony, silicon, nickel, or cobalt analogues of the aforementioned salts.

In some embodiments, the first electrolyte solvent or the second electrolyte solvent can include a polar solvent. In some embodiments, the polar solvent can include 1,2-dimethoxyethane, bis(2-methoxyethyl) ether, triethylene glycol dimethyl ether, tetraethylene glycol dimethyl ether, diethyl ether, dipropyl ether, 1,2-dipropoxyethane, dibutoxyethane, 1,2-diethoxypropane, bis-(2-fluoro-ethyl)-ether, 1,2-diethoxyethane, dimethyl carbonate, 1,3-dioxolane, 1,4-dioxolane, ethyl methyl carbonate, diethyl carbonate, tetrahydropyran, dimethyl sulfoxide, ethyl vinyl sulfone, tetramethylene sulfone, ethyl methyl sulfone, ethylene carbonate, vinylene carbonate, fluoroethylene carbonate, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, water, carbonate, dimethyl carbonate, 1,3-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, fluoroethylene carbonate, or any combination thereof.

In some embodiments, the polar solvent can be non-flammable. In some embodiments, the polar solvent can include organic phosphates, phosphites, phosphonates, phosphoramides include substituted and unsubstituted aliphatic and aryl phosphates, phosphites, phosphonates, and/or phosphoramides. In some embodiments, the phosphazenes may be organic or inorganic. Exemplary solvents include, tributyl phosphate, triphenyl phosphate, tris(2,2,2-trifluoroethyl) phosphate, bis(2,2,2-trifluoroethyl) methyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl)methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), or any combination thereof.

In some embodiments, the first electrolyte solvent or the second electrolyte solvent can include a non-polar solvent. In some embodiments, the non-polar solvent can include fluoroether, and/or fluorobutane, for instance, 1,1,2,2-tetrafluoroethyl-2,2,3,3-tetrafluoropropyl ether, bis(2,2,2-trifluoroethyl) ether, 1,1,2,2,-tetrafluoroethyl-2,2,2-trifluoroethyl ether, tris(2,2,2-trifluoroethyl) orthoformate, pentafluoroethyl 2,2,2-trifluoroethyl ether, 2,2,3,3,4,4,5,5-octafluoro-1-pentanol, methoxynonafluorobutane, ethoxynonafluorobutane, 2,2,2-trifluoroethyl nonafluorobutanessulfonate, 1,1,2,2-tetrafluoroethyl-2,2,3,3-tetrafluoropropyl ether, bis(2,2,2-trifluoroethyl) ether, 1,1,2,2,-tetrafluoroethyl-2,2,2-trifluoroethyl ether, tris(2,2,2-trifluoroethyl) orthoformate, pentafluoroethyl 2,2,2-trifluoroethyl ether, 2,2,3,3,4,4,5,5-octafluoro-1-pentanol, 3,3,4,4,5,5-hexafluorotetrahydropyran or any combination thereof.

At step 13, a third electrolyte solution is optionally formed. In some embodiments, the third solution can include a polar solvent. In some embodiments, the polar solvent can include 1,2-dimethoxyethane, bis(2-methoxyethyl) ether, triethylene glycol dimethyl ether, tetraethylene glycol dimethyl ether, diethyl ether, dipropyl ether, 1,2-dipropoxyethane, dibutoxyethane, 1,2-diethoxypropane, bis-(2-fluoroethyl)-ether, 1,2-diethoxyethane, dimethyl carbonate, 1,3-dioxolane, 1,4-dioxolane, ethyl methyl carbonate, diethyl carbonate, tetrahydropyran, dimethyl sulfoxide, ethyl vinyl sulfone, tetramethylene sulfone, ethyl methyl sulfone, ethylene carbonate, vinylene carbonate, fluoroethylene carbonate, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, water, carbonate, dimethyl carbonate, 1,3-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, fluoroethylene carbonate, or any combination thereof.

In some embodiments, the polar solvent can be non-flammable. In some embodiments, the polar solvent can include organic phosphates, phosphites, phosphonates, phosphoramides include substituted and unsubstituted aliphatic and aryl phosphates, phosphites, phosphonates, and/or phosphoramides. In some embodiments, the phosphazenes may be organic or inorganic. Exemplary solvents include, tributyl phosphate, triphenyl phosphate, tris(2,2,2-trifluoroethyl) phosphate, bis(2,2,2-trifluoroethyl) methyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl)methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), or any combination thereof.

In some embodiments, the third solution can include a non-polar solvent. In some embodiments, the non-polar solvent can include fluoroether, and/or fluorobutane, for instance, 1,1,2,2-tetrafluoroethyl-2,2,3,3-tetrafluoropropyl ether, bis(2,2,2-trifluoroethyl) ether, 1,1,2,2,-tetrafluoroethyl-2,2,2-trifluoroethyl ether, tris(2,2,2-trifluoroethyl) orthoformate, pentafluoroethyl 2,2,2-trifluoroethyl ether, 2,2,3,3,4,4,5,5-octafluoro-1-pentanol, methoxynonafluorobutane, ethoxynonafluorobutane, 2,2,2-trifluoroethyl nonafluorobutanessulfonate, 1,1,2,2-tetrafluoroethyl-2,2,3,3-tetrafluoropropyl ether, bis(2,2,2-trifluoroethyl) ether, 1,1,2,2,-tetrafluoroethyl-2,2,2-trifluoroethyl ether, tris(2,2,2-trifluoroethyl) orthoformate, pentafluoroethyl 2,2,2-trifluoroethyl ether, 2,2,3,3,4,4,5,5-octafluoro-1-pentanol, 3,3,4,4,5,5-hexafluorotetrahydropyran or any combination thereof.

In some embodiments, the third solution can include an ion conductive salt. In some embodiments, the third solution can include lithium bis(fluorosulfonyl)imide ($F_2LiNO_4S_2$), lithium bis(trifluoromethylsulfonyl)imide ($LiC_2F_6NO_4S_2$), lithium bis(oxalato) borate, lithium hexafluorophosphate ($LiPF_6$), lithium hexafluoroarsenate ($LiAsF_6$), lithium bis (trifluoromethane) sulfonimide ($LiN(SO_2CF_3)_2$), lithium trifluoromethanesulfonate ($LiCF_3SO_3$), lithium perchlorate ($LiClO_4$), lithium difluoro oxalato borate ($LiBF_2$ ($C_2O_4$)), lithium iodide (LiI), lithium bromide (LiBr), lithium chloride (LiCl), lithium hydroxide (LiOH), lithium nitrate ($LiNO_3$), lithium 2-trifluoromethyl-4,5-dicyanoimidazole (LiTDI), lithium sulfate ($LiSO_4$), lithium difluorophosphate ($LiPO_2F_2$), lithium tetrafluoroborate ($LiBF_4$) or any combination thereof. In some embodiments, the salt can include sodium, potassium, magnesium, zinc, cesium, indium, tin, antimony, silicon, nickel, or cobalt analogues of the aforementioned salts. In some embodiments, the ion conductive salt can have a concentration in the third solution of about 0.1 M, about 0.2 M, about 0.3 M, about 0.4 M, about 0.5 M, about 0.6 M, about 0.7 M, about 0.8 M, about 0.9 M, about 1 M, about 2 M, about 3 M, about 4 M, about 5 M, about 6 M, about 7 M, about 8 M, about 9 M, or about 10 M, inclusive of all values and ranges therebetween.

At step 14, the first electrolyte solution and the second electrolyte solution (and optionally the third electrolyte solution) are combined. In some embodiments, the electrolyte mixture can include at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, at least about 85 wt %, or at least about 90 wt % of the first electrolyte solution. In some embodiments, the electrolyte mixture can include no more than about 90 wt %, no more than about 85 wt %, no more than 80 wt %, no more than about 75 wt %, no more than about 70 wt %, no more than about 65 wt %, no more than about 60 wt %, no more than about 55 wt %, no more than about 50 wt %, no more than about 45 wt %, no more than about 40 wt %, no more than about 35 wt %, no more than about 30 wt %, no more than about 25 wt %, or no more than about 20 wt % of the first electrolyte solution. Combinations of the above-referenced weight percentages are also possible (e.g., at least about 10 wt % and no more than about 90 wt % or at least about 40 wt % and no more than about 70 wt %), inclusive of all values and ranges therebetween. In some embodiments, the electrolyte mixture can include about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, or about 90 wt % of the first electrolyte solution.

In some embodiments, the electrolyte mixture can include at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, or at least about 85 wt % of the second electrolyte solution. In some embodiments, the electrolyte mixture can include no more than about 90 wt %, no more than about 85 wt %, no more than 80 wt %, no more than about 75 wt %, no more than about 70 wt %, no more than about 65 wt %, no more than about 60 wt %, no more than about 55 wt %, no more than about 50 wt %, no more than about 45 wt %, no more than about 40 wt %, no more than about 35 wt %, no more than about 30 wt %, no more than about 25 wt %, or no more than about 20 wt % of the second electrolyte solution. Combinations of the above-referenced weight percentages are also possible (e.g., at least about 10 wt % and no more than about 90 wt % or at least about 40 wt % and no more than about 70 wt %), inclusive of all values and ranges therebetween. In some embodiments, the electrolyte mixture can include about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, or about 90 wt % of the second electrolyte solution.

In some embodiments, the electrolyte mixture can include about 90 wt % of the first electrolyte solution and about 25 wt % of the second electrolyte solution. In some embodiments the electrode mixture may include about 75 wt % of Solution 1 and about 25 wt % of Solution 2. In some embodiments, the electrolyte mixture may include about 75 wt % of 3 M LiFSI in DME and about 25 wt % of 2 M LiFSI in BFE. In some embodiments, the electrolyte mixture can include about 43 wt % of LiFSI, about 39 wt % of DME, and about 18 wt % of BFE (i.e., "75:25 Solution").

In some embodiments, the electrolyte mixture can include about 50 wt % of the first electrolyte solution and about 50 wt % of the second electrolyte solution. In some embodiments the electrode mixture may include about 50 wt % of Solution 1 and about 50 wt % of Solution 2. In some embodiments, the electrolyte 110 may include about 50 wt % of 3 M LiFSI in DME and about 50 wt % of 2 M LiFSI in BFE. In some embodiments, the electrolyte 110 may include about 38 wt % of LiFSI, about 26 wt % of DME, and about 36 wt % of BFE (i.e., "50:50 Solution").

In some embodiments, the electrolyte mixture can include about 10 wt % of the first electrolyte solution and about 90 wt % of the second electrolyte solution. In some embodiments the electrode mixture may include about 25 wt % of Solution 1 and about 75 wt % of Solution 2. In some embodiments, the electrolyte mixture may include about 25 wt % of 3 M LiFSI in DME and about 75 wt % of 2 M LiFSI in BFE. In some embodiments, the electrolyte 110 can include about 33 wt % of LiFSI, about 13 wt % of DME, and about 54 wt % of BFE (i.e., "25:75 Solution").

In some embodiments, the electrolyte mixture can include about 10 wt % to about 42 wt % of an electrolyte solvent, about 13 wt % to about 59 wt % of a fluoroether (FE), and about 22 wt % to about 43 wt % of a salt including bis(fluorosulfonyl)imide ions (e.g., LiFSI or NaFSI). In some embodiments, the electrolyte mixture may include between about 26 wt % and about 39 wt % of DME. In some embodiments, the electrolyte mixture may include between about 18 wt % and about 36 wt % of BFE.

In some embodiments, the electrolyte mixture can include between about 3 wt % to about 5 wt % of $LiPF_6$. In some embodiments, the electrolyte mixture can include about 3.8 wt % $LiPF_6$. In some embodiments, the electrolyte mixture can include the 50:50 Solution and about 3.8 wt % $LiPF_6$. In some embodiments, the electrolyte mixture can include between about 0.5 wt % to about 2 wt % of $LiPO_2F_2$. In some embodiments, the electrolyte mixture can include about 1 wt % of $LiPO_2F_2$. In some embodiments, the electrolyte mixture may include the 50:50 Solution, about 3.8 wt % of $LiPF_6$, and about 1 wt % of $LiPO_2F_2$. In some embodiments, the electrolyte mixture may include between about 0.1 wt % to about 5.5 wt % trioxane. In some embodiments, the electrolyte mixture may include about 0.5 wt % trioxane, 1 about wt % trioxane, about 2 wt % trioxane, or about 5 wt % trioxane. In some embodiments, the electrolyte mixture may include the 50:50 Solution, and may further include between about 0.1 wt % to about 10 wt % of trioxane. In some embodiments, the electrolyte mixture may include the 50:50 Solution and about 0.5 wt % trioxane. In some embodiments, the electrolyte mixture may include the 50:50 Solution and about 1 wt % trioxane. In some embodiments, the electrolyte mixture may include the 50:50 Solution and about 2 wt % trioxane. In some embodiments, the electrolyte mixture may include the 50:50 Solution and about 5 wt % trioxane.

In some embodiments, the electrolyte mixture can include a first alkaline salt (about 5 wt % to about 60 wt %) and a second alkaline salt (about 0 wt % to about 60 wt %) in fluoroether and other solvents (about 0.5 wt % to about 95 wt %) with a non-flammable solvent additive (about 0 wt % to about 75 wt %) and a salt additive (about 0.1 wt % to about 10 wt %). In some embodiments, the electrolyte mixture can have a boiling point and/or a vapor pressure within about 20% of the boiling point and/or vapor pressure of the 50:50 solution.

In some embodiments, the electrolyte mixture may include between about 40 wt % to about 60 wt % of Solution 2 and further include between about 2 M to about 5 M LiFSI in DME. In some embodiments, the electrolyte mixture may include about 50 wt % of Solution 2 and 4 M LiFSI in DME. In some embodiments, the electrolyte mixture may include about 50 wt % of Solution 2 and further include between about 1 M to about 2 M LiFSI in 1,4-dioxane In some embodiments, the electrolyte mixture may include about 50 wt % of Solution 2 and further include about 1.5 M LiFSI in 1,4-dioxane. In some embodiments, the electrolyte mixture can include between about 2 wt % to about 25 wt % Solution 2 mixed with non-volatile electrolyte (NVE). In some embodiments, the electrolyte mixture may include about 5 wt % of Solution 2 mixed with NVE. In some embodiments, the electrolyte mixture may include about 10 wt % of Solution 2 mixed with NVE. In some embodiments, the electrolyte may include about 20 wt % of Solution 2 mixed with NVE. In some embodiments the electrolyte mixture including Solution 2 and NVE may be used with a graphite anode and a lithium iron phosphate cathode.

In some embodiments, the first electrolyte solution and second electrolyte solution can be mixed using a variety of methods such as, for example, vortex mixing, ball mill mixing, manual mixing, inversion mixing, etc., until the electrolytes are substantially homogenous. The method 10 may optionally include incorporating the electrolyte mixture into an electrochemical cell at step 15. For example, the electrolyte mixture may be injected into an electrochemical cell or electrochemical cell stack. In some embodiments, the electrolyte mixture can be used for pre-mixing electrode materials. For example, the electrolyte mixture may be combined with at least one of the active materials, binder, and additives, and mixed in a vessel (e.g., using a centrifuge mixer) until the mixture is homogenous. In some embodiments, the electrolyte mixture may have a conductivity of at least about 7 mS/cm (e.g., 7 mS/cm, 8 mS/cm, 9 mS/cm, or at least about 10 mS/cm, inclusive)+.

Figure 4:
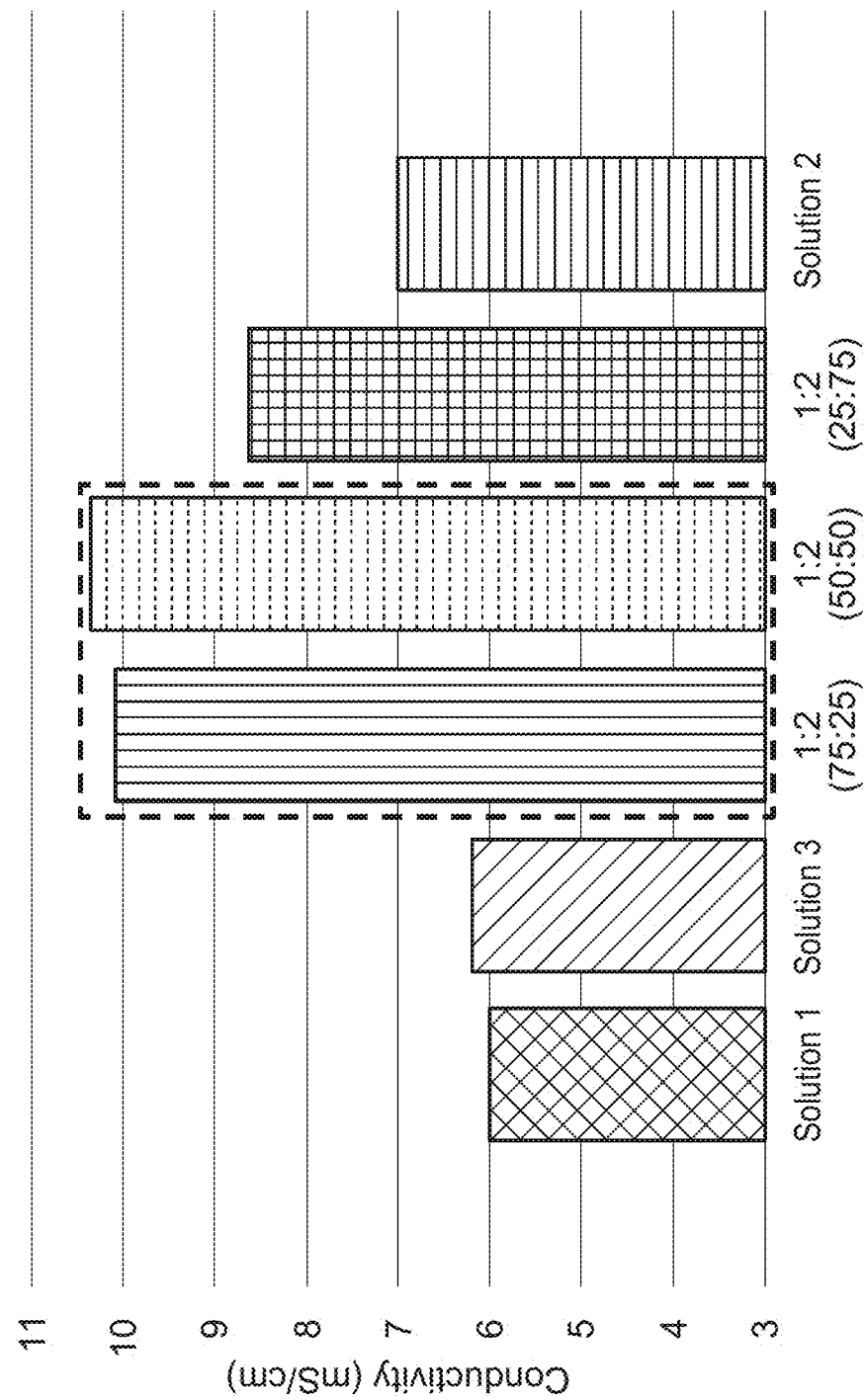
FIG. 4 is a graph showing conductivities of various electrolyte compositions.

FIG. 4 is a graph showing conductivities of various electrolyte compositions. As shown, the conductivity is measured in mS/cm for six different electrolyte solutions. The blue bar labeled "Solution 1" refers to Solution 1 as described in FIG. 3. The dark blue bar labeled "Solution 2" refers to Solution 2 as described in FIG. 3. The green bar labeled "Solution 3" refers to an electrolyte solution including LiFSI with a concentration of 2 M with DME and 1,1,2,2-tetrafluoroethyl-2,2,3,3-tetrafluoropropyl ether (TTE). The orange bar labeled "1:2 (75:25)" refers to the 75:25 Solution as described in FIG. 3. The grey bar labeled "1:2 (50:50)" refers to the 50:50 Solution as described in FIG. The yellow bar labeled "1:2 (25:75)" refers to the 25:75 Solution as described in FIG. 3. As shown in the graph, the 50:50 Solution has the best conductivity at approximately 10.3 mS/cm. The 75:25 Solution has the next best conductivity with a conductivity of approximately 10.1 mS/cm. The 25:75 Solution has the third best conductivity with a conductivity of approximately 8.6 mS/cm. Use of the 50:50 Solution and the 75:25 Solution allows better access to electroactive material, which results in better cycle retention.

Figure 5:
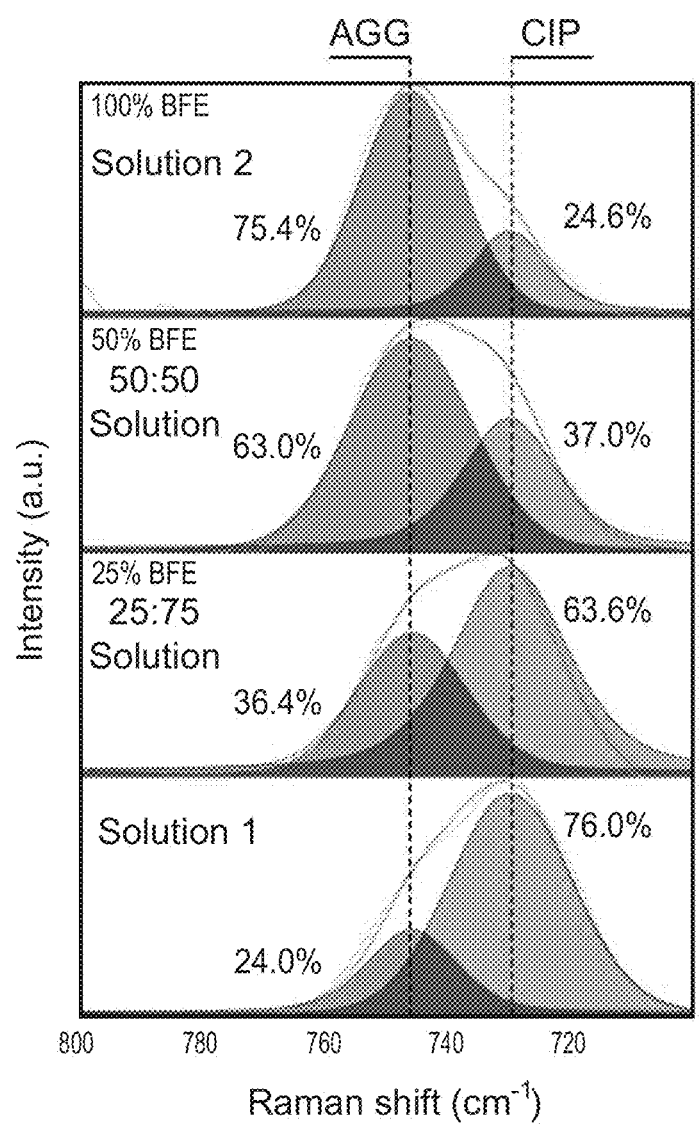
FIG. 5 is a graph showing Raman spectroscopies of various solvents.

FIG. 5 is a graph showing Raman spectroscopies of various solvents. The Raman spectroscopies of Solution 3, the 50:50 Solution, the 25:75 Solution, and Solution 1. As shown, the Solution 3 plot has a 75.4% AGG peak and 24.6% CIP peak. The 50:50 Solution plot has a 63.0% AGG peak and a 37.0% CIP peak. The 25:75 Solution plot has a 36.4% AGG peak and a 63.6% CIP peak. The Solution 1 plot has a 24.0% AGG peak and a 76.0% CIP peak. Solution 1 has an ionic conductivity of about 6 mS/cm. Solution 2 has an ionic conductivity of about 6.7 mS/cm. The 50:50 Solution and the 25:75 Solution each have conductivities of more than 10 mS/cm.

Figure 6:
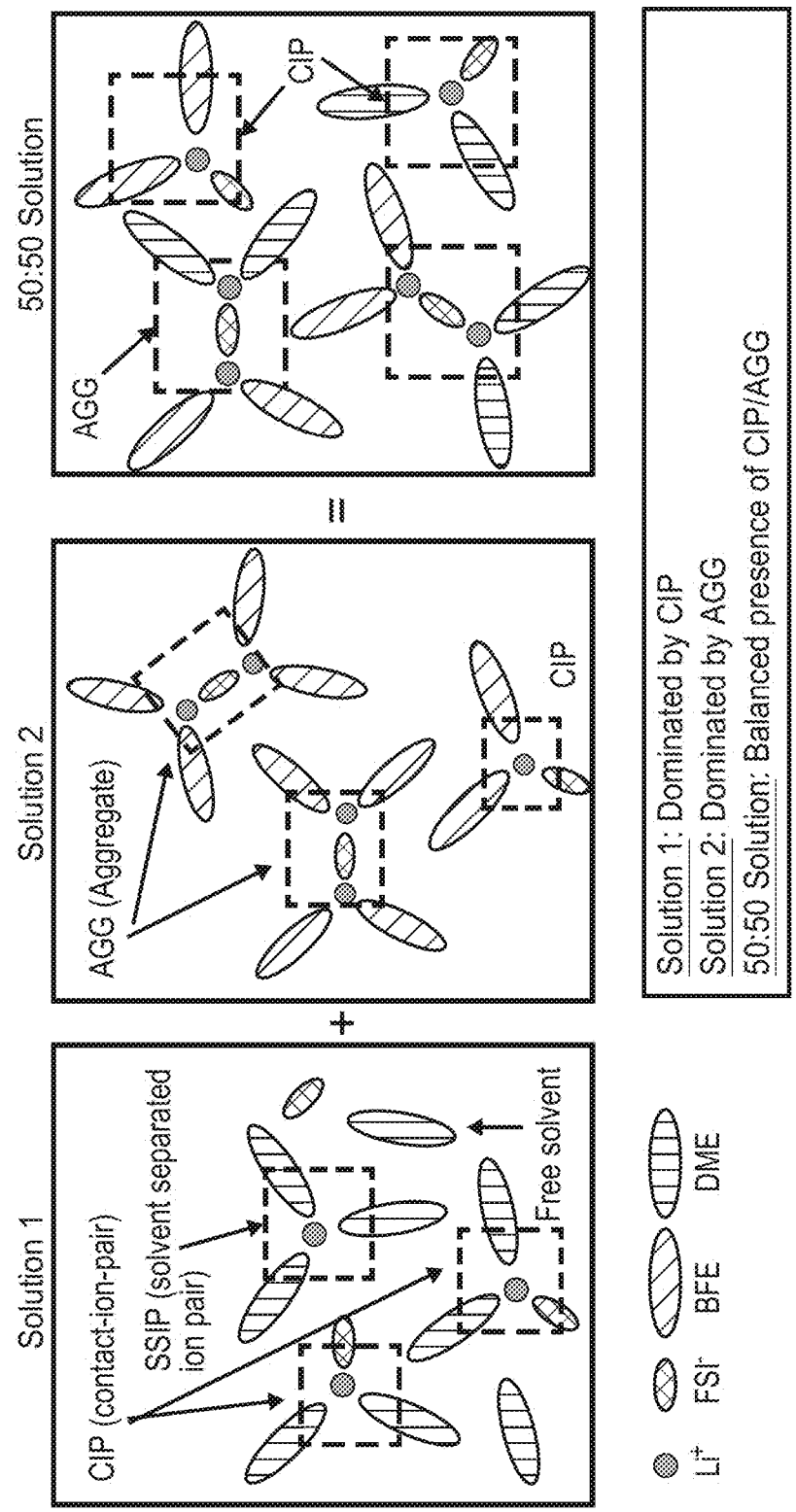
FIG. 6 is an illustration showing hypothesized molecular interactions between solvents and salts.

FIG. 6 is an illustration showing hypothesized molecular interactions between solvents and salts based on the Raman spectroscopies. As shown in the left panel, Solution 1 includes (1) contact-ion-pairs (CIP) formed from a Li+ ion, an FSI charged ion, and two DME molecules, (2) solvent separated ion pairs (SSIP) formed from a Li+ ion and three DME molecules; (3) Free FSI anion and (4) free solvent (e.g., free DME). As shown in the center panel, Solution 2 includes (1) aggregates (AGG) formed from two Li+ ions, an FSI ion and four BFE molecules; CIP's formed from a Li+ ion, an FSI-charged molecule, and two BFE molecules. As shown in the right panel, in an electrolyte solution with a 50:50 ratio of Solution 1 to Solution 2, it is hypothesized that aggregate clusters (AGG) may form between the CIP's formed with DME and the CIP's formed with BFE. Formation of AGG may be critical for forming a high-quality SEI layer, which can be beneficial for cycling of the Li-metal cell (and/or LIBs). Additionally, the interaction between coordinated DME and BFE clusters may facilitate cation transport, which may improve ionic conductivity and is hypothesized to improve transference number. Additionally, the strong interaction between hydrogen and fluorine atoms among BFE molecules and strong solvation between salt and solvent (e.g., DME and BFE) lowers the electrolyte volatility of the 50:50 solution.

Figure 7:
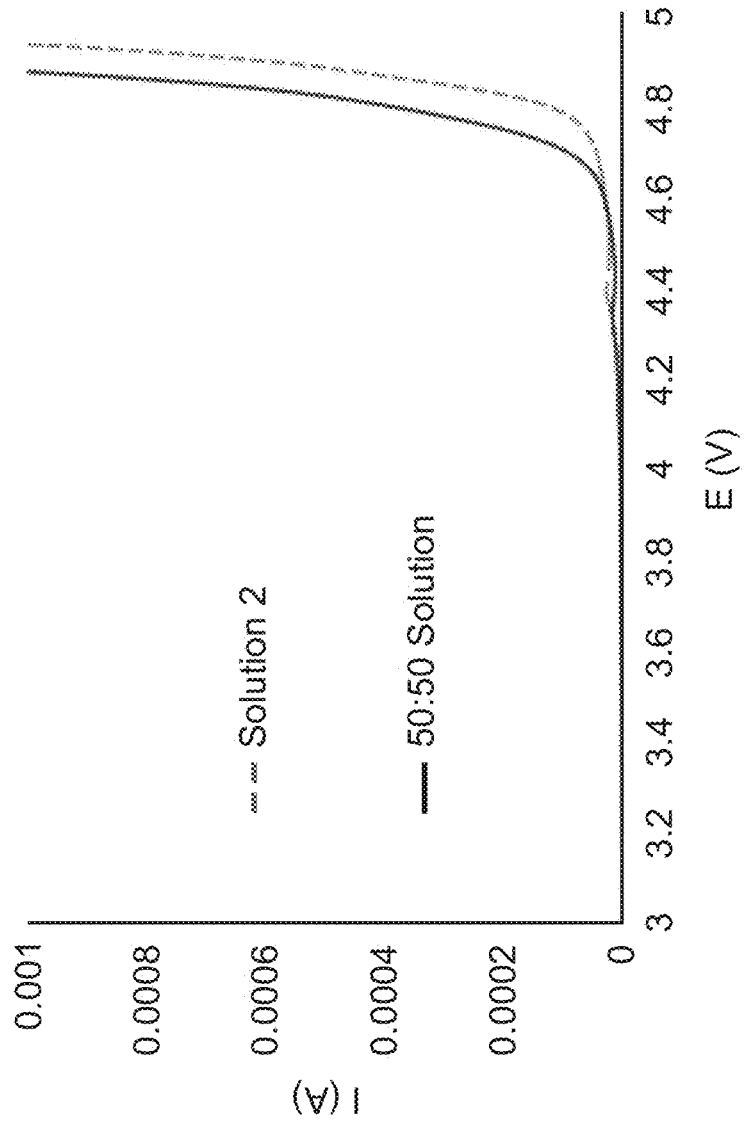
FIG. 7 is a graph showing voltage curves for electrochemical cells with various electrolyte formulations.

FIG. 7 is a graph showing current-voltage curves for electrochemical cells with various electrolyte formations. The current-voltage curves were generated by performing linear sweep voltammetry and measuring a current (I) in amperes (A) of Lithium/Aluminum (Li/Al) electrochemical cells (i.e., cells with a lithium anode and an aluminum cathode current collector). The scan rate used was 0.5 millivolts/second (m V/s). Two types of electrochemical cells were tested: a Li/Al cell with Solution 2 as electrolyte (grey), and a Li/Al cell with the 50:50 Solution as electrolyte (dark blue). The results show that Solution 2 and the electrolyte with the 50:50 Solution demonstrate a practical high voltage stability and minimal decomposition at potentials greater than 4.2V.

Figure 8:
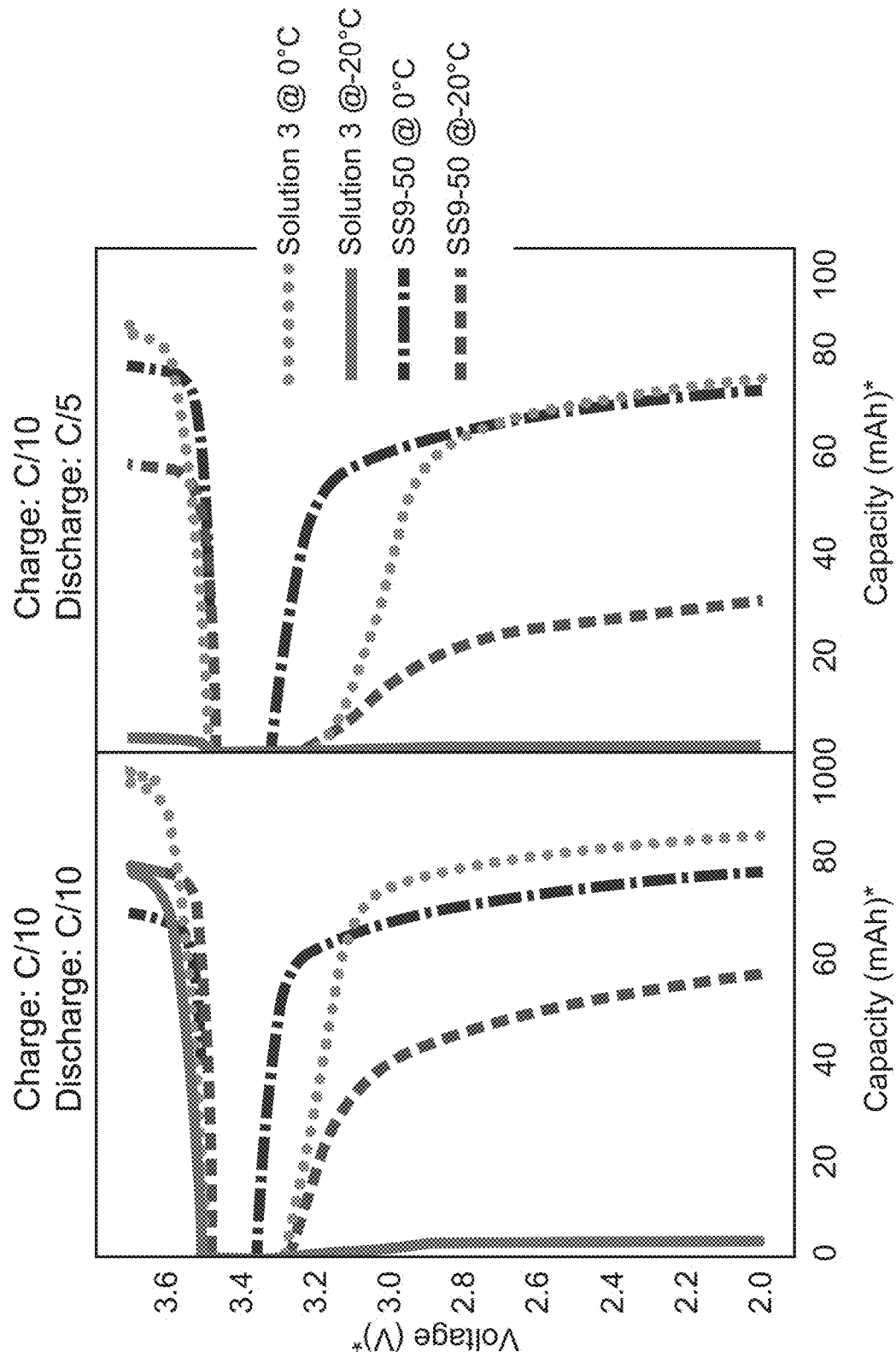
FIG. 8 shows plots of voltage curves for electrochemical cells with various electrolyte formulations at different temperatures.

FIG. 8 shows plots of capacity versus voltage for electrochemical cells with various electrolyte formulations at different temperatures. The electrochemical cells tested have a cathode including 55 vol % LFP and 0.3 vol % KB and an anode including 50 µm thick lithium metal. Solution 3 at 0° C. is shown in blue, Solution 3 at −20° C. is shown in orange, the 50:50 Solution at 0° C. is shown in red, and the 50:50 solution at −20° C. is shown in green. The left panel shows curves corresponding to cells being charged over 10 hours and discharged over 10 hours, and the right panel shows curves corresponding to the cells being charged over 10 hours and discharged over 3 hours. At −20° C., the 50:50 Solution retains approximately 75% of capacity when discharged over 10 hours and approximately 38% of capacity when discharged over 5 hours, whereas Solution 3 delivers negligible capacity at both discharge rates. These results demonstrate that the 50:50 solution outperforms existing electrolyte solutions at low temperatures.

Figure 9:
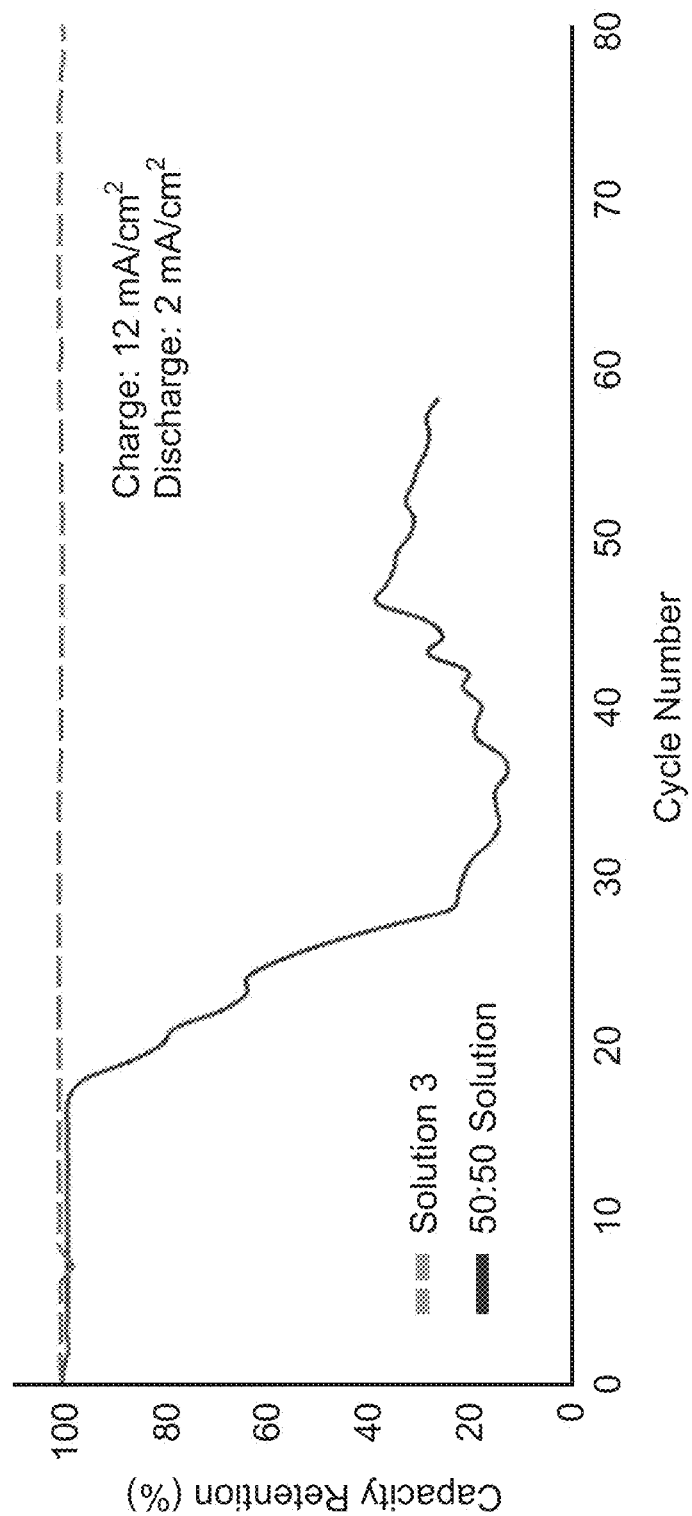
FIG. 9 shows a comparison of capacities of electrochemical cells prepared with different electrolyte solutions.

FIG. 9 shows a comparison of lithium metal batteries prepared with 50:50 Solution as well as Solution 3. As shown, the battery prepared with the 50:50 Solution retains about 100% of initial capacity through at least 80 cycles, while the battery prepared with Solution 3 fades around cycle 25.

Figure 10:
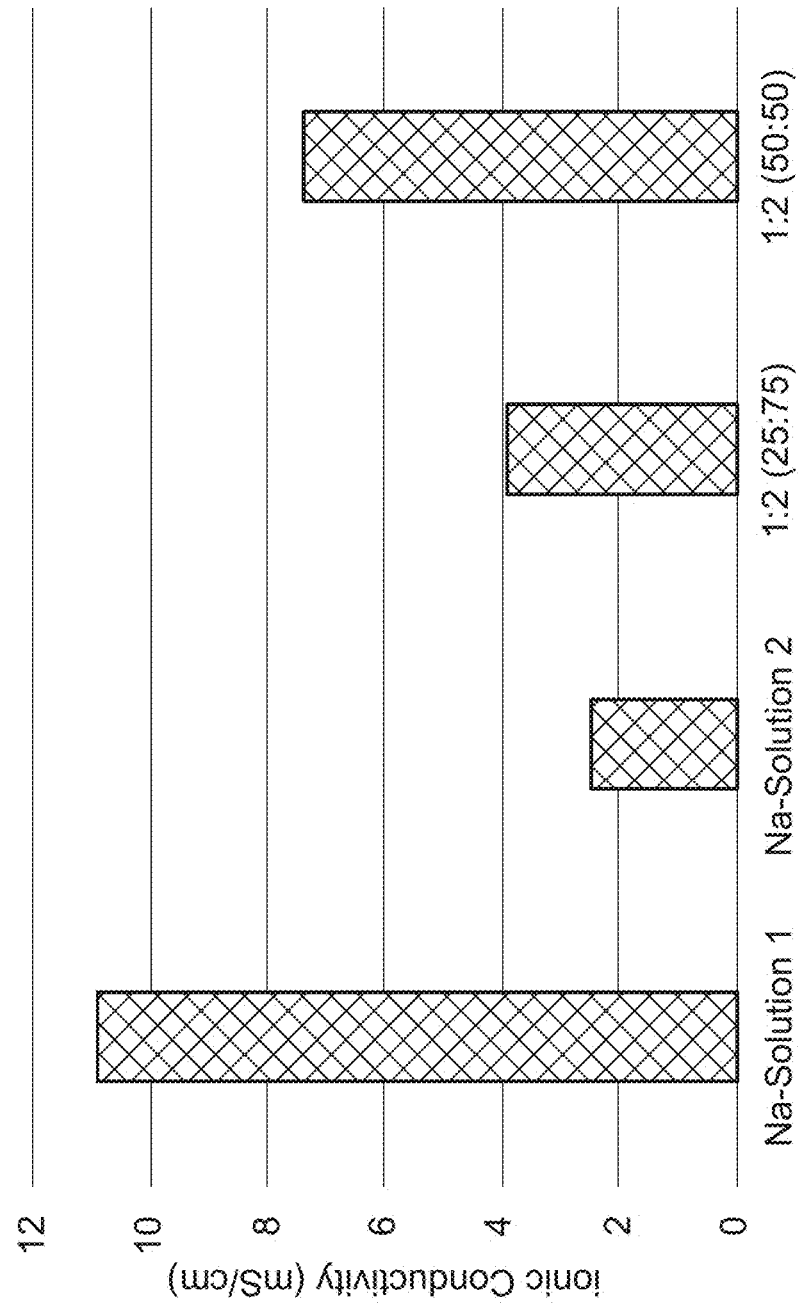
FIG. 10 shows a comparison of conductivities of various sodium-based electrolyte solutions.

FIG. 10 shows a comparison of conductivities of various sodium-based electrolyte solutions. Na-Solution 1 is 1 M NaFSI in BFE. Na-Solution 2 is 4 M NaFSI in DME. Percentages of the 1:2 mixtures are by weight (i.e., 25 wt % of Na-Solution 1 and 75 wt % of Na-Solution 2, 50 wt % of Na-Solution 1 and 50 wt % of Na-Solution 2). As shown, ionic conductivities are shown as approximately proportional to the respective conductivities and percentages of the two solutions mixed. Ionic conductivities range from about 2 mS/cm to about 11 mS/cm.

Figure 11:
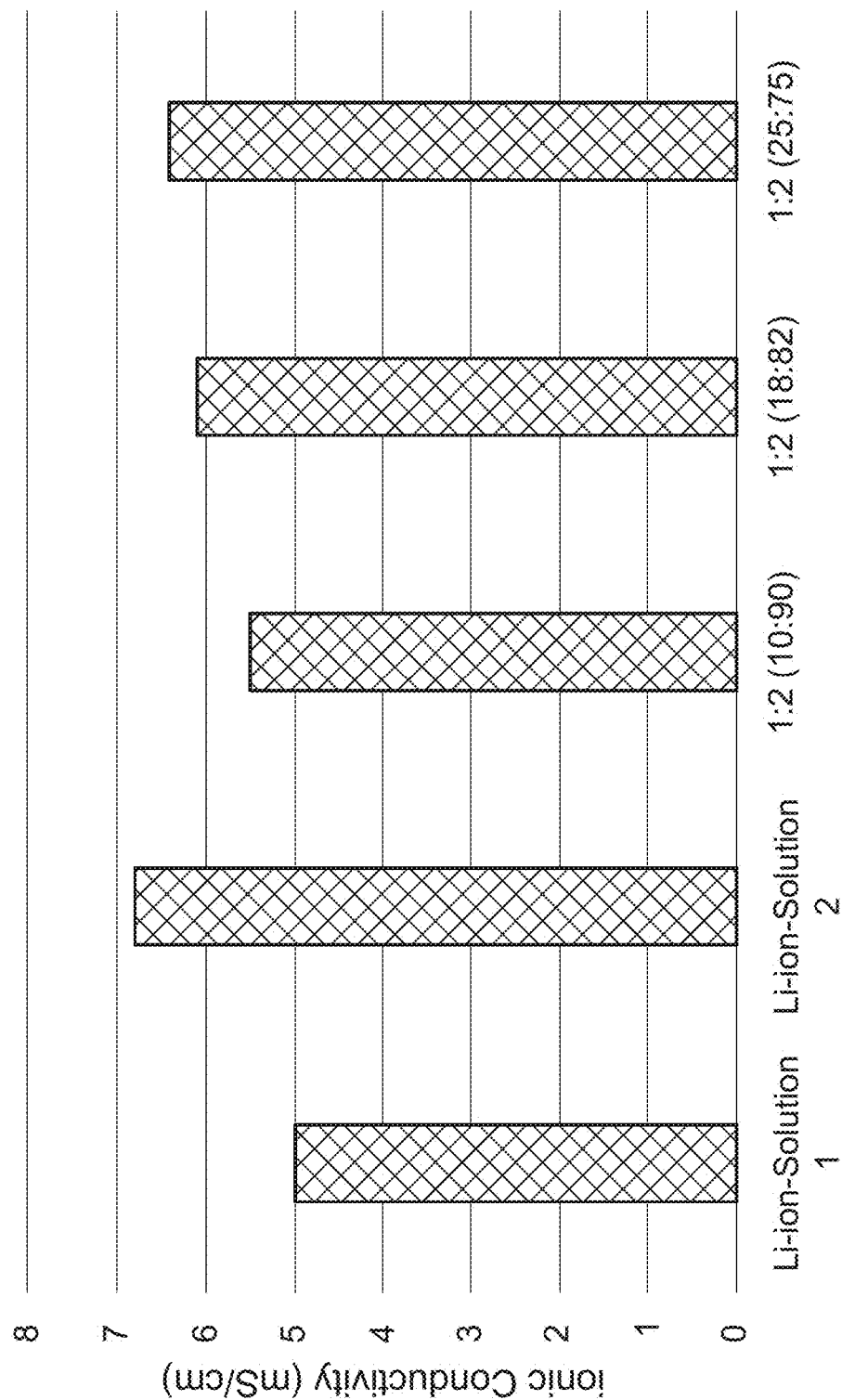
FIG. 11 shows a comparison of conductivities of various lithium-based electrolyte solutions.

FIG. 11 shows a comparison of conductivities of various lithium-based electrolyte solutions. Li-ion-Solution 1 is 3 M LiFSI in EC/DMC (30 wt % EC to 70 wt % DMC). Li-ion-Solution 2 is 2 M LiFSI in BFE. Mixtures are shown as 90 wt %, 82 wt %, and 75 wt % of Li-ion-Solution 1.

Figure 12A:
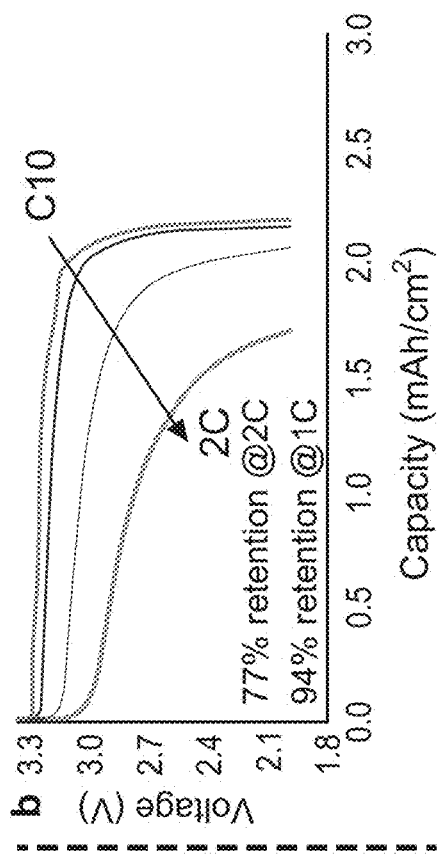
FIGS. 12A-12B show comparisons of discharge curves between a control electrolyte and a BFE-containing electrolyte.
Figure 12B:
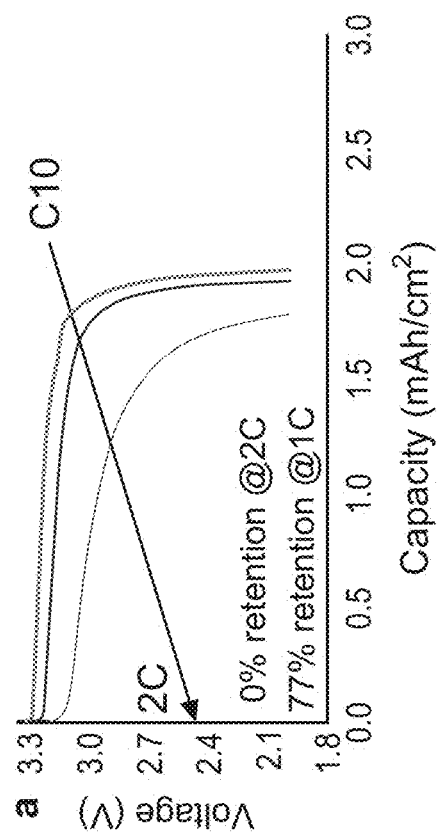

FIGS. 12A-12B show comparisons of discharge curves between a control electrolyte and a BFE-containing electrolyte. Cells were produced with graphite anodes, LFP cathodes, and a polyethylene (PE) separator. A control electrolyte included 25 wt % of 2 M LiFSI in BFE and 75 wt % 1 M $LiPF_6$ in EC/PC (1:1). Cells were discharged at rates between C/10 and 2 C. The control cell (FIG. 12A) retained 0% of its capacity at 2 C and 77% of its capacity at 1 C. The BFE-containing cell retained 77% of its capacity at 2 C and 94% of its capacity at 1 C.

FIG. 13 shows a plot of conductivity of an electrolyte formed by mixing a second solution (Solution 2) including BFE with a first solution (Solution 1) including LiFSI and a fluoroether in a ratio of solution 1:solution 2 of 2:1, such that the electrolyte includes about 75 wt % of solution 1 and about 25 wt % of solution 2. The conductivity of solution 2 is less than 1 mS/cm and the conductivity of solution 1 is about 7 mS/cm. In contrast, the conductivity of the electrolyte formed by mixing solution 1 with solution 2 is greater than 12 mS/cm, substantially higher than the respective conductivities of each of solution 1 and solution 2.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," of, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of forming an electrolyte, comprising:
    forming a first electrolyte solution, the first electrolyte solution including about 26 wt % to about 70 wt % of a first salt including bis(fluorosulfonyl)imide ions and about 30 wt % to about 74 wt % of a first electrolyte solvent;
    forming a second electrolyte solution, the second electrolyte solution including about 2 wt % to about 42 wt % of a second salt and about 38 wt % to about 98 wt % of a second electrolyte solvent different from the first electrolyte solvent;
    combining the first electrolyte solution and the second electrolyte solution to form an electrolyte mixture such that the electrolyte mixture includes about 10 wt % to about 90 wt % of the first electrolyte solution and about 10 wt % to about 90 wt % of the second electrolyte solution; and
    incorporating the electrolyte mixture into an electrochemical cell such that the electrolyte mixture forms the electrolyte of the electrochemical cell.

2. The method of claim 1, wherein the electrolyte mixture includes about 20 wt % to about 30 wt % of the first electrolyte solution and about 70 wt % to about 80 wt % of the second electrolyte solution.

3. The method of claim 1, wherein the first electrolyte solution comprises an electrolyte additive, the electrolyte additive including at least one of tris-(trimethylsilyl) phosphate (TMSP), trimethoxy (3,3,3-trifluoropropyl)silane (TTS), pentafluorophenyltriethoxysilane (TPS), boric acid tris(trimethylsilyl) ester (TMSB), tris-(pentafluorophenyl) silane (TPFPS), 1,10-sulfonyldiimidazole (SDM), trioxane, lithium difluorophosphate, lithium difluoro oxalato borate, lithium nitrate, (pentafluorophenyl)diphenylphosphine (PFPDPP), cetyltrimethylammonium bromide (CTAB), sodium dodecyl sulfate (SDS), polyethylene-glycol (PEG-8000), benzotriazole (BTA), thiourea ($CH_4N_2S$), sodium dodecyl benzene sulfonate (SDBS), LiTFSI, PVA, PEG, or CMC.

4. The method of claim 1, wherein the electrolyte mixture comprises:
    about 10 wt % to about 42 wt % of a product solvent, the product solvent including a mixture of the first electrolyte solvent and the second electrolyte solvent;
    about 13 wt % to about 43 wt % of a fluoroether (FE); and
    about 22 wt % to about 43 wt % of the first salt, wherein the FE includes a compound having the following structure:

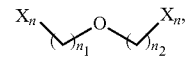

where n1 and n2 each have values between 1 and 5, X=F, Br, Cl, or I, and n=1.

5. The method of claim 1, wherein the second salt includes LiBF4 in a range of about 4 wt % to 19 wt % of the second electrolyte solution.

6. The method of claim 1, wherein bis(fluorosulfonyl) imide ions included in the first salt, or the second salt includes at least one of LiFSI or NaFSI.

7. The method of claim 6, wherein the LiFSI or NaFSI is in a range of about 2 wt % to about 42 wt % of the first electrolyte solution.

8. The method of claim 1, wherein:
    the first electrolyte solvent includes at least one of 1,2-dimethoxyethane, bis-(2-fluoro-ethyl)-ether, 1,2-diethoxyethane, bis(2-methoxyethyl) ether, triethylene glycol dimethyl ether, tetraethylene glycol dimethyl ether, diethyl ether, dipropyl ether, 1,2-dipropoxyethane, dibutoxyethane, 1,2-diethoxypropane, dimethyl carbonate, 1,3-dioxolane, 1,4-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, fluoroethylene carbonate, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, water, carbonate, fluorobutane, or tetrahydropyran; and
    the second electrolyte solvent includes a fluoroether (FE).

9. The method of claim 8, wherein the fluoroether includes a compound having the following structure:

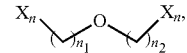

where $n_1$ and $n_2$ each have values between 1 and 5, X=F, Br, Cl, or I, and n=1.

10. The method of claim 8, wherein at least one of the first salt or the second salt includes at least one of lithium bis(fluorosulfonyl) imide ($F_2LiNO_4S_2$), lithium bis(trifluoromethylsulfonyl) imide ($LiC_2F_6NO_4S_2$), lithium bis(oxalato)borate, lithium hexafluorophosphate ($LiPF_6$), lithium hexafluoroarsenate ($LiAsF_6$), lithium bis(trifluoromethane) sulfonimide ($LiN(SO_2CF_3)_2$), lithium trifluoromethanesulfonate ($LiCF_3SO_3$), lithium perchlorate ($LiClO_4$), lithium difluoro oxalato borate ($LiBF_2(C_2O_4)$), lithium iodide (LiI), lithium bromide (LiBr), lithium chloride (LiCl), lithium hydroxide (LiOH), lithium nitrate ($LiNO_3$), lithium 2-trifluoromethyl-4,5-dicyanoimidazole (LiTDI), lithium sulfate ($LiSO_4$), lithium difluorophosphate ($LiPO_2F_2$), or lithium tetrafluoroborate ($LiBF_4$).

11. The method of claim 1, further comprising:

forming a third electrolyte solution, the third electrolyte solution including a third salt and a third electrolyte solvent; and combining the third electrolyte solution with the first electrolyte solution and the second electrolyte solution to form the electrolyte mixture.

12. The method of claim 11, wherein the third salt includes at least one of lithium bis(fluorosulfonyl) imide ($F_2LiNO_4S_2$), lithium bis(trifluoromethylsulfonyl) imide ($LiC_2F_6NO_4S_2$), lithium bis(oxalato)borate, lithium hexafluorophosphate ($LiPF_6$), lithium hexafluoroarsenate ($LiAsF_6$), lithium bis(trifluoromethane) sulfonimide ($LiN(SO_2CF_3)2$), lithium trifluoromethanesulfonate ($LiCF_3SO_3$), lithium perchlorate ($LiClO_4$), lithium difluoro oxalato borate ($LiBF_2(C_2O_4)$), lithium iodide (LiI), lithium bromide (LiBr), lithium chloride (LiCl), lithium hydroxide (LiOH), lithium nitrate ($LiNO_3$), lithium 2-trifluoromethyl-4,5-dicyanoimidazole (LiTDI), lithium sulfate ($LiSO_4$), lithium difluorophosphate ($LiPO_2F_2$), lithium tetrafluoroborate ($LiBF_4$).

13. The method of claim 11, wherein the third electrolyte solution includes at least one of 1,2-dimethoxyethane, bis (2-methoxyethyl) ether, triethylene glycol dimethyl ether, tetraethylene glycol dimethyl ether, diethyl ether, dipropyl ether, 1,2-dipropoxyethane, dibutoxyethane, 1,2-diethoxypropane, bis-(2-fluoro-ethyl)-ether, 1,2-diethoxyethane, dimethyl carbonate, 1,3-dioxolane, 1,4-dioxolane, ethyl methyl carbonate, diethyl carbonate, tetrahydropyran, dimethyl sulfoxide, ethyl vinyl sulfone, tetramethylene sulfone, ethyl methyl sulfone, ethylene carbonate, vinylene carbonate, fluoroethylene carbonate, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, water, carbonate, fluorobutane, 1,1,2,2-tetrafluoroethyl-2,2,3,3-tetrafluoropropyl ether, bis(2,2,2-trifluoroethyl) ether, 1,1,2,2,-tetrafluoroethyl-2,2,2-trifluoroethyl ether, tris(2,2,2-trifluoroethyl)orthoformate, pentafluoroethyl 2,2,2-trifluoroethyl ether, 2,2,3,3,4,4,5,5-octafluoro-1-pentanol, methoxynonafluorobutane, ethoxynonafluorobutane, 2,2,2-trifluoroethyl nonafluorobutanesulfonate, 1,1,2,2-tetrafluoroethyl-2,2,3,3-tetrafluoropropyl ether, bis(2,2,2-trifluoroethyl) ether, 1,1,2,2,-tetrafluoroethyl-2,2,2-trifluoroethyl ether, tris(2,2,2-trifluoroethyl)orthoformate, pentafluoroethyl 2,2,2-trifluoroethyl ether, 2,2,3,3,4,4,5,5-octafluoro-1-pentanol, or 3,3,4,4,5,5-hexafluorotetrahydropyran.

14. A method of forming an electrolyte, comprising:

forming a first electrolyte solution, the first electrolyte solution including about 26 wt % to about 70 wt % of a first salt and about 30 wt % to about 74 wt % of a first electrolyte solvent;

forming a second electrolyte solution, the second electrolyte solution including about 2 wt % to about 42 wt % of a second salt and about 38 wt % to about 98 wt % of a second electrolyte solvent different from the first electrolyte solvent, the second electrolyte solvent including a fluoroether; and combining the first electrolyte solution and the second electrolyte solution to form an electrolyte mixture such that the electrolyte mixture includes about 10 wt % to about 90 wt % of the first electrolyte solution and about 10 wt % to about 90 wt % of the second electrolyte solution, the electrolyte mixture configured to be incorporated into an electrochemical cell to form the electrolyte of the electrochemical cell.

15. The method of claim 14, wherein the fluoroether includes bis(2-fluoroethyl) ether (BFE).

16. The method of claim 14, wherein the first salt includes bis(fluorosulfonyl)imide ions.

17. The method of claim 14, wherein the first salt includes at least one of lithium bis(fluorosulfonyl)imide ($F_2LiNO_4S_2$), lithium bis(trifluoromethylsulfonyl) imide ($LiC_2F_6NO_4S_2$), lithium bis(oxalato)borate, lithium hexafluorophosphate ($LiPF_6$), lithium hexafluoroarsenate ($LiAsF_6$), lithium bis(trifluoromethane) sulfonimide ($LiN(SO_2CF_3)_2$), lithium trifluoromethanesulfonate ($LiCF_3SO_3$), lithium perchlorate ($LiClO_4$), lithium difluoro oxalato borate ($LiBF_2(C_2O_4)$), lithium iodide (LiI), lithium bromide (LiBr), lithium chloride (LiCl), lithium hydroxide (LiOH), lithium nitrate ($LiNO_3$), lithium 2-trifluoromethyl-4,5-dicyanoimidazole (LiTDI), lithium tetrafluoroborate ($LiBF_4$), lithium sulfate ($LiSO_4$), or lithium difluorophosphate ($LiPO_2F_2$).

18. The method of claim 14, wherein the electrolyte mixture includes about 20 wt % to about 30 wt % of the first electrolyte solution and about 70 wt % to about 80 wt % of the second electrolyte solution.

19. The method of claim 14, wherein the electrolyte mixture includes about 70 wt % to about 80 wt % of the first electrolyte solution and about 20 wt % to about 30 wt % of the second electrolyte solution.

20. The method of claim 14, wherein the electrolyte mixture includes about 40 wt % to about 60 wt % of the first electrolyte solution and about 40 wt % to about 60 wt % of the second electrolyte solution.

21. The method of claim 14, wherein the fluoroether includes a compound having the following structure:

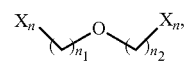

where $n_1$ and $n_2$ each have values between 1 and 5, X=F, Br, Cl, or I, and n=1.

22. The method of claim 14, wherein the electrolyte mixture comprises:

about 10 wt % to about 42 wt % of a product solvent, the product solvent including a mixture of the first electrolyte solvent and the second electrolyte solvent;

about 13 wt % to about 43 wt % of the fluoroether (FE); and about 22 wt % to about 43 wt % of the first salt, wherein the FE includes a compound having the following structure:

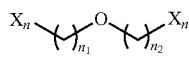

where n1 and n2 each have values between 1 and 5, X=F, Br, Cl, or I, and n=1.

23. A method of forming an electrolyte, comprising:
forming a first electrolyte solution, the first electrolyte solution including a first salt including bis(fluorosulfonyl)imide ions and about 30 wt % to about 74 wt % of a first electrolyte solvent;
forming a second electrolyte solution, the second electrolyte solution including a second salt and about 38 wt % to about 98 wt % of a second electrolyte solvent different from the first electrolyte solvent, the second electrolyte solvent including a fluoroether;
combining the first electrolyte solution and the second electrolyte solution to form an electrolyte mixture such that the electrolyte mixture includes about 10 wt % to about 90 wt % of the first electrolyte solution and about 10 wt % to about 90 wt % of the second electrolyte solution, the electrolyte mixture configured to be combined with an anode, a cathode, and a separator to form an electrochemical cell,
wherein the electrolyte mixture comprises:
about 10 wt % to about 42 wt % of a product solvent, the product solvent including a mixture of the first electrolyte solvent and the second electrolyte solvent;
about 13 wt % to about 59 wt % of the fluoroether (FE); and
about 22 wt % to about 43 wt % of the first salt.

24. The method of claim 23, wherein the fluoroether includes a compound having the following structure:

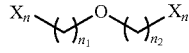

where $n_1$ and $n_2$ each have values between 1 and 5, X=F, Br, Cl, or I, and n=1.

25. The method of claim 23, wherein the electrolyte mixture includes about 20 wt % to about 30 wt % of the first electrolyte solution and between about 70 wt % and about 80 wt % of the second electrolyte solution.

26. The method of claim 23, wherein the electrolyte mixture includes about 70 wt % to about 80 wt % of the first electrolyte solution and about 20 wt % to about 30 wt % of the second electrolyte solution.

27. The method of claim 23, wherein the electrolyte mixture includes about 40 wt % to about 60 wt % of the first electrolyte solution and about 40 wt % to about 60 wt % of the second electrolyte solution.

28. The method of claim 23, wherein the first electrolyte solvent includes at least one of 1,2-dimethoxyethane, bis-(2-fluoro-ethyl)-ether, 1,2-diethoxyethane, bis(2-methoxyethyl) ether, triethylene glycol dimethyl ether, tetraethylene glycol dimethyl ether, diethyl ether, dipropyl ether, 1,2-dipropoxyethane, dibutoxyethane, 1,2-diethoxypropane, dimethyl carbonate, 1,3-dioxolane, 1,4-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, fluoroethylene carbonate, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, water, carbonate, fluorobutane, or tetrahydropyran.

29. The method of claim 23, further comprising:
forming a third electrolyte solution, the third electrolyte solution including a third salt and a third electrolyte solvent; and
combining the third electrolyte solution with the first electrolyte solution and the second electrolyte solution to form the electrolyte mixture.

30. The method of claim 29, wherein the third salt includes at least one of lithium bis(fluorosulfonyl)imide ($F_2LiNO_4S_2$), lithium bis(trifluoromethylsulfonyl) imide ($LiC_2F_6NO_4S_2$), lithium bis(oxalato)borate, lithium hexafluorophosphate ($LiPF_6$), lithium hexafluoroarsenate ($LiAsF_6$), lithium bis(trifluoromethane) sulfonimide (LiN($SO_2CF_3)_2$), lithium trifluoromethanesulfonate ($LiCF_3SO_3$), lithium perchlorate ($LiClO_4$), lithium difluoro oxalato borate ($LiBF_2(C_2O_4)$), lithium iodide (LiI), lithium bromide (LiBr), lithium chloride (LiCl), lithium hydroxide (LiOH), lithium nitrate ($LiNO_3$), lithium 2-trifluoromethyl-4,5-dicyanoimidazole (LiTDI), lithium sulfate ($LiSO_4$), lithium difluorophosphate ($LiPO_2F_2$), lithium tetrafluoroborate ($LiBF_4$).

31. A method of forming an electrolyte, comprising:
forming a first electrolyte solution, the first electrolyte solution including about 26 wt % to about 70 wt % of a first salt including bis(fluorosulfonyl)imide ions and about 30 wt % to about 74 wt % of a first electrolyte solvent;
forming a second electrolyte solution, the second electrolyte solution including about 2 wt % to about 42 wt % of a second salt and about 38 wt % to about 98 wt % of a second electrolyte solvent different from the first electrolyte solvent; and
combining the first electrolyte solution and the second electrolyte solution to form the electrolyte such that the electrolyte includes about 10 wt % to about 90 wt % of the first electrolyte solution and about 10 wt % to about 90 wt % of the second electrolyte solution, wherein the electrolyte comprises:
about 10 wt % to about 42 wt % of a product solvent, the product solvent including a mixture of the first electrolyte solvent and the second electrolyte solvent;
about 13 wt % to about 43 wt % of a fluoroether (FE); and
about 22 wt % to about 43 wt % of the first salt, wherein the FE includes a compound having the following structure:

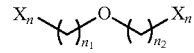

where n1 and n2 each have values between 1 and 5, X=F, Br, Cl, or I, and n=1.

32. The method of claim 31, wherein the electrolyte includes about 20 wt % to about 30 wt % of the first electrolyte solution and about 70 wt % to about 80 wt % of the second electrolyte solution.

33. The method of claim 31, wherein:
the first electrolyte solvent includes at least one of 1,2-dimethoxyethane, bis-(2-fluoro-ethyl)-ether, 1,2-diethoxyethane, bis(2-methoxyethyl) ether, triethylene glycol dimethyl ether, tetraethylene glycol dimethyl ether, diethyl ether, dipropyl ether, 1,2-dipropoxyethane, dibutoxyethane, 1,2-diethoxypropane, dimethyl carbonate, 1,3-dioxolane, 1,4-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, fluoroethylene carbonate, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, water, carbonate, fluorobutane, or tetrahydropyran; and
the second electrolyte solvent includes a fluoroether (FE).

34. A method of forming an electrolyte, comprising:
forming a first electrolyte solution, the first electrolyte solution including about 26 wt % to about 70 wt % of a first salt and about 30 wt % to about 74 wt % of a first electrolyte solvent;
forming a second electrolyte solution, the second electrolyte solution including about 2 wt % to about 42 wt % of a second salt and about 38 wt % to about 98 wt % of a second electrolyte solvent different from the first electrolyte solvent, the second electrolyte solvent including a fluoroether; and
combining the first electrolyte solution and the second electrolyte solution to form the electrolyte such that the electrolyte includes about 10 wt % to about 90 wt % of the first electrolyte solution and about 10 wt % to about 90 wt % of the second electrolyte solution, wherein the electrolyte comprises:
about 10 wt % to about 42 wt % of a product solvent, the product solvent including a mixture of the first electrolyte solvent and the second electrolyte solvent;
about 13 wt % to about 43 wt % of the fluoroether (FE); and
about 22 wt % to about 43 wt % of the first salt,
wherein the FE includes a compound having the following structure:

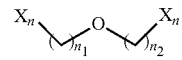

where n1 and n2 each have values between 1 and 5, X=F, Br, Cl, or I, and n=1.

35. The method of claim 34, wherein the fluoroether includes bis(2-fluoroethyl) ether (BFE).

36. The method of claim 34, wherein the first salt includes bis(fluorosulfonyl)imide ions.

* * * * *